United States Patent
Ito et al.

(10) Patent No.: US 8,488,009 B2
(45) Date of Patent: Jul. 16, 2013

(54) IMAGE PROCESSING APPARATUS, IMAGE PROCESSING METHOD, AND PROGRAM

(75) Inventors: Atsushi Ito, Tokyo (JP); Toshio Yamazaki, Tokyo (JP); Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 378 days.

(21) Appl. No.: 12/510,578

(22) Filed: Jul. 28, 2009

(65) Prior Publication Data

US 2010/0026880 A1    Feb. 4, 2010

(30) Foreign Application Priority Data

Jul. 31, 2008    (JP) ................. P2008-197947

(51) Int. Cl.
*H04N 5/228* (2006.01)
*H04N 5/235* (2006.01)
*G06K 9/36* (2006.01)
*G06K 9/40* (2006.01)

(52) U.S. Cl.
USPC ........... 348/208.99; 348/208.4; 348/362; 348/222.1; 382/232; 382/264

(58) Field of Classification Search
USPC ............ 348/208.99, 208.1, 208.2, 208.4, 348/208.12, 208.13, 362, 363, 240.99, 221.1, 348/222.1; 382/232, 166, 239, 264
See application file for complete search history.

(56) References Cited

U.S. PATENT DOCUMENTS

| | | | | |
|---|---|---|---|---|
| 2004/0066460 | A1* | 4/2004 | Kondo et al. | 348/222.1 |
| 2004/0170330 | A1 | 9/2004 | Fogg | |
| 2007/0070221 | A1 | 3/2007 | Nishi et al. | |
| 2008/0259169 | A1* | 10/2008 | Nagano et al. | 348/208.4 |
| 2010/0214422 | A1* | 8/2010 | Iwamura et al. | 348/208.4 |

FOREIGN PATENT DOCUMENTS

| | | |
|---|---|---|
| EP | 2 003 876 A2 | 12/2008 |
| EP | 2 111 039 A1 | 10/2009 |
| GB | 2 297 450 A | 7/1996 |
| JP | 05-161103 * | 6/1993 |
| JP | 07-203428 | 8/1995 |
| JP | 11-252409 | 9/1999 |
| JP | 11-266462 | 9/1999 |
| JP | 2001-352546 | 12/2001 |
| JP | 2003-006650 | 1/2003 |
| JP | 2004-080252 | 3/2004 |
| JP | 2006-074777 | 3/2006 |
| JP | 2006-81150 | 3/2006 |
| JP | 2006-260520 | 9/2006 |
| JP | 2007-124397 | 5/2007 |
| JP | 2007-274299 | 10/2007 |
| WO | WO 2007-114220 | 10/2007 |

OTHER PUBLICATIONS

European Search Report dated Nov. 6, 2009, in EP 09 25 1836.

* cited by examiner

*Primary Examiner* — Nhan T Tran
(74) *Attorney, Agent, or Firm* — Finnegan, Henderson, Farabow, Garrett & Dunner, LLP

(57) ABSTRACT

An image processing apparatus includes a motion-blur adding mechanism performing filter processing on moving image data to be subjected to coding processing in accordance with motion information indicating motion of an image between unit images included in the moving image data as pre-processing of the coding processing so that motion-blur addition processing is performed.

7 Claims, 19 Drawing Sheets

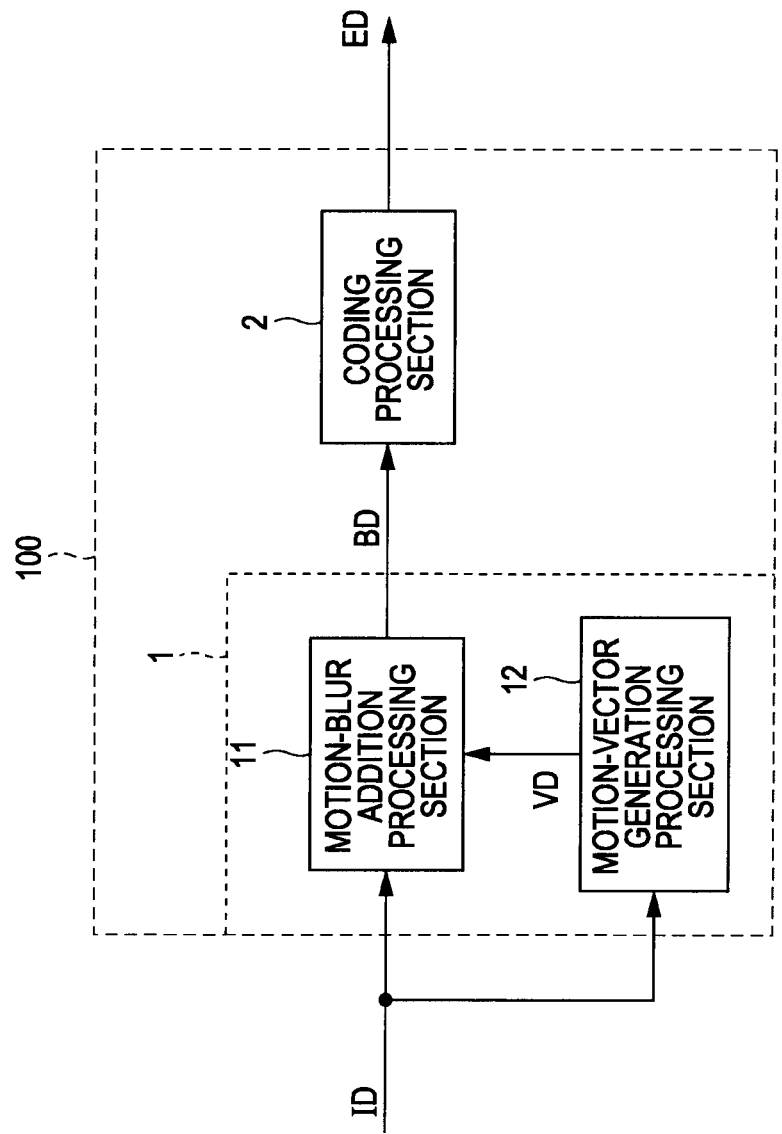

IMAGE PROCESSING APPARATUS, IMAGE PROCESSING METHOD, AND PROGRAM

BACKGROUND OF THE INVENTION

1. Field of the Invention

The present invention relates to an image processing apparatus and method, and a program.

2. Description of the Related Art

In general, a moving image has a huge amount of data, and thus moving image data has been commonly compressed before the moving image is stored, transmitted, etc.

A typical method for compressing moving image data is moving-image coding which combines inter-frame coding, such as MPEG (Moving Picture Experts Group), etc., and intra-frame coding.

In order to improve the coding efficiency of the moving-image coding by the MPEG system, many proposals have been made on the method of performing pre-processing on a moving image.

For example, in Japanese Unexamined Patent Application Publication No. 2001-352546, the occurrence of block distortion after coding is suppressed by applying a low-pass filter on an image as pre-processing.

However, in the method described in Japanese Unexamined Patent Application Publication No. 2001-352546, the suppression of the occurrence of block distortion at the time of coding is intended, and it is unavoidable to have losses in detail by the application of the low-pass filter.

SUMMARY OF THE INVENTION

In the present invention, motion-blur addition is performed by image processing in which a low-pass filter simulating a motion blur caused by an exposure time period at shooting time is adaptively applied to an image using motion information in a moving image. Thereby, it is desirable to provide an image processing apparatus, an image processing method, and a program which enable a viewer of a moving image to have a natural image quality and which allows the improvement of the coding efficiency.

According to an embodiment of the present invention, there is provided an image processing apparatus including a motion-blur adding means for performing filter processing on moving image data to be subjected to coding processing as pre-processing of the coding processing in accordance with motion information indicating motion of an image between unit images included in the moving image data so that motion-blur addition processing is performed.

Also, the image processing apparatus may further include a motion-vector generation means for generating a motion vector as the motion information from the moving image data, wherein the motion-blur adding means may perform the filter processing on the moving image data using the motion vector generated by the motion-vector generation means so that the motion-blur addition processing is performed.

The motion-blur adding means may perform the filter processing adding motion-blur to the moving image data using motion information to be used for coding the moving image data in coding processing in a subsequent stage.

Also, the motion-blur adding means may obtain an optimum shutter speed corresponding to the subject speed for each area in the image data by referring to relating information relating a subject speed and a shooting shutter speed reducing deterioration of an output image, and may adjust an amount of the motion blur on the basis of a relationship between the shooting shutter speed and the optimum shutter speed.

Also, in addition to these configurations, the image processing apparatus may further include a coding means for coding the moving image data having been subjected to the motion-blur addition processing by the motion-blur adding means.

Also, a motion-blur addition parameter used at the time of the motion-blur adding means performing the motion-blur addition processing and the moving image data may be externally output.

The motion-blur addition parameter may be any one of flag information indicating whether a motion blur is added or not for each area of each unit image of the moving image data, the motion vector information used for the motion-blur addition processing, and compensation information of the motion vector.

Also, according to another embodiment of the present invention, there is provided an image processing apparatus including a motion-blur reducing means, receiving decoded moving image data having been coded after subjected to motion-blur addition processing, for performing filter processing on the decoded moving image data in accordance with motion information indicating motion of an image between unit images included in the moving image data so that motion-blur reduction processing is performed.

Also, the image processing apparatus may further include a motion-vector generation means for generating a motion vector as the motion information from the decoded moving image data, wherein the motion-blur reducing means may perform the filter processing on the moving image data using the motion vector generated by the motion-vector generation means so that the motion-blur reduction processing is performed.

Also, the motion-blur reducing means may perform the filter processing reducing the motion-blur using motion information used for decoding the moving image data in decoding processing in a preceding stage.

Also, in addition to these configurations, the image processing apparatus may further include a decoding means for decoding the moving image data having been subjected to coding after the motion-blur addition. The motion-blur reducing means performs the motion-blur reduction processing on the decoded moving image data input from the decoding means.

Also, the motion-blur reducing means may select whether or not to perform the motion-blur reduction processing or may adjust the degree of the motion-blur reduction processing on the basis of a motion-blur addition parameter used at the time of performing the motion-blur addition processing. The motion-blur addition parameter may be any one of flag information indicating whether a motion blur is added or not for each area of each unit image of the moving image data, the motion vector information used for the motion-blur addition processing, and compensation information of the motion vector.

According to another embodiment of the present invention, there is provided a first method of processing an image, including the steps of: performing filter processing on moving image data to be subjected to coding processing in accordance with motion information indicating motion of an image between unit images included in the moving image data so that motion-blur addition processing is performed; and coding the moving image data having been subjected to the motion-blur addition processing.

Also, according to another embodiment of the present invention, there is provided a second method of processing an image, including the steps of: decoding moving image data having been subjected to motion-blur addition processing and coding, and performing filter processing on the decoded moving image data in accordance with motion information indicating motion of an image between unit images included in the moving image data so that motion-blur reduction processing is performed.

The first and the second programs according to the present invention are programs for causing an information processing apparatus to perform individual steps of the first and the second methods, respectively.

That is to say, in the present invention, motion-blur addition is performed by image processing in which a low-pass filter simulating a motion blur caused by an exposure time period at shooting time is applied to an image using motion information in the moving image adaptively. Thereby, it is possible for a viewer of a moving image to have a natural image quality and to improve the coding efficiency.

In the first image processing apparatus, the first image processing, and the first program, according to the present invention, it becomes possible for a viewer of a moving image to have a more natural image quality and to improve the coding efficiency by applying a low-pass filter simulating a motion blur compared with the case of applying a spatially uniform low-pass filter.

Also, the filtering is performed adaptively for each area by referring to motion information, and thus in particular in an area in which a subject is moving at a high speed, it is expected that the image quality is easily maintained and the coding efficiency is improved even if an intensive low-pass filter is applied in a wide area compared with the case of applying a spatially uniform low-pass filter.

Also, in the second image processing apparatus, the second image processing, and the second program, the filtering is performed adaptively for each area by referring to motion information, and thus it is possible to reduce a motion blur for each area in accordance with the size of the motion including the adjustment of the amount of motion blur as the subsequent processing if necessary compared with the case of applying a spatially uniform low-pass filter at coding time (that is to say, a spatially uniform high-pass filter at decoding time). Accordingly, it is possible to display a natural image quality for the viewer of the moving image.

Also, in the case where the parameters of the motion-blur addition processing in the pre-processing of the coding are transmitted (or it is difficult to do so), it is possible to perform the motion-blur reduction processing using only the motion information. That is to say, it is possible to perform the processing by the motion vector transmitted for use in coding and decoding or only by the motion information obtained after decoding. This is an advantage over the case of applying a spatially uniform low-pass filter at coding time (that is to say, a spatially uniform high-pass filter at decoding time), because it is necessary to transmit some kind of filter information at the time of low-pass filtering in that case.

Also, if a moving image, an animation, etc., captured at a high-speed shutter are displayed using display device, such as a projector, a display unit, etc., the movement of a moving object included in the image is displayed discontinuously, and thus the viewer of the image perceives ghost. This is image deterioration called "motion jerkiness" (reference: ANSI T1.801.02.02-1996), and this occurs frequently.

On the other hand, if a moving image captured at a low-speed shutter, such as open shutter, etc., is displayed, the loss of details or an unclear edge of a subject often occurs by the influence of a motion blur. Such a phenomenon is image deterioration called a "blur (motion blur)".

In the first image processing apparatus, the first image processing, and the first program according to the present invention, a motion blur is added in order to improve the compression rate of the coding. Thereby, the coding efficiency is improved, and at the same time, it becomes possible to reduce the above-described jerkiness.

Also, in the second image processing apparatus, the second image processing, and the second program, according to the present invention, the image quality is improved by performing motion-blur reduction processing on the decoded image data to which a motion blur is added.

Also, by combining the first image processing apparatus, the first image processing, and the first program with the second image processing apparatus, the second image processing, and the second program, it becomes possible to reduce both the jerkiness and the blur, and to obtain the image data, which has not been subjected to the motion-blur addition processing, after decoding.

By the present invention, it is possible to improve coding efficiency. For example, the present invention is preferably applied to a system in which one of apparatuses, corresponding to the first image processing apparatus, performs coding image data and transmitting the image data, and the other of the apparatuses, corresponding to the second image processing apparatus, receives the image data and decodes the image data.

Also, it becomes possible to achieve the display of images having natural image quality and suppressing jerkiness and blur, which arise in moving image data.

BRIEF DESCRIPTION OF THE DRAWINGS

FIG. 3 is a block diagram of an example of another configuration of the first image processing apparatus according to the embodiment;

DESCRIPTION OF THE PREFERRED EMBODIMENTS

Figure 1:
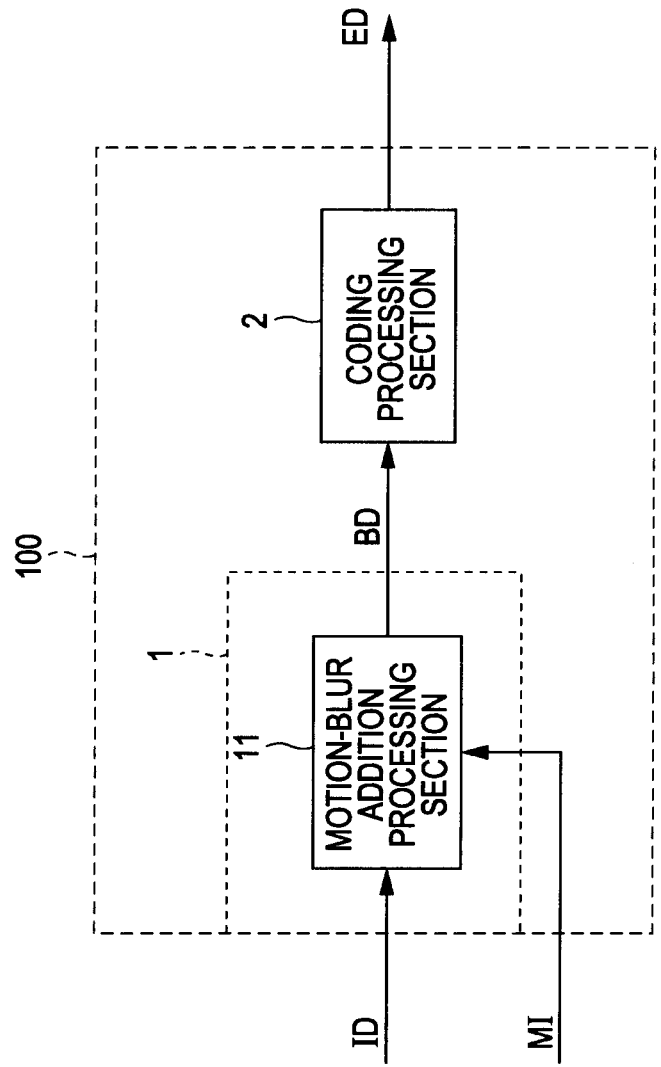
FIG. 1 is a block diagram of a first image processing apparatus according to an embodiment of the present invention.

In the following, a description will be given of an embodiment of the present invention in the following order. In this regard, the first image processing apparatus is an image processing apparatus which performs motion-blur addition processing in the preceding stage of the coding, and the second image processing apparatus is an image processing apparatus which performs decoding and motion-blur reduction processing on the moving image data transmitted from the first image processing apparatus.

1. The first image processing apparatus
 1.1 Example of the configuration of the image processing apparatus
 1.2 Motion-vector generation processing section
 1.3 Motion-blur addition processing section
2. The second image processing apparatus
 2.1 Example of the configuration of the image processing apparatus
 2.2 Motion-blur reduction processing section
3. Information transmission between the first and the second apparatuses
4. Program
1. The First Image Processing Apparatus
 1.1 Example of the Configuration of the Image Processing Apparatus A description will be given of an example of the configuration of the first image processing apparatus, that is to say, an image processing apparatus performing motion-blur addition processing at the preceding stage of coding with reference to FIGS. 1, 3, and 4.

In this regard, a processing block in each figure indicates a logical constituent element, and the individual processing blocks may be contained in a same casing, or may also be contained in different casings. In each figure, an image processing apparatus 1 surrounded by a broken line or an image processing apparatus 100 surrounded by a broken line can be thought as the configuration of the first image processing apparatus according to an embodiment of the present invention.

FIG. 1 illustrates a configuration in which the image processing apparatus 1 includes a motion-blur addition processing section 11. Alternatively, FIG. 1 illustrates a configuration in which the image processing apparatus 100 includes the motion-blur addition processing section 11 and a coding processing section 2.

The motion-blur addition processing section 11 adds a motion blur to input moving image data ID, and outputs the data to the subsequent stage, the coding processing section 2.

The moving image data ID and motion information MI of each area (an area is a pixel unit or a pixel block unit including a plurality of pixels) of each frame of the moving image data ID are input into the motion-blur addition processing section 11. The motion-blur addition processing section 11 adaptively performs filter processing on the moving image data ID to add a motion blur.

Motion-blurred image data BD having been subjected to the motion-blur addition processing is input into the coding processing section 2, and is subjected to coding processing.

The coding processing section 2 performs compression processing, such as coding, etc., conforming to the MPEG (Moving Picture Experts Group) standards, etc., for example.

The coded data ED, which is produced by the compression-processing on the motion-blurred image data BD, has improved compression efficiency compared with the coded data produced by directly inputting the moving image data ID into the coding processing section 2.

A description will be given of the reason that the compression efficiency is improved by adding a motion blur to moving image data with reference to FIG. 2.

Here, a description will be specifically given of the fact that the compression efficiency is improved by applying a low-pass filter. The simulative addition of a motion blur arising by an exposure period at shooting time is said to be a kind of applying a low-pass filter.

In general, image data can be compressed, because the data has a high correlation between neighboring pixels. In order to increase a compression rate, a correlation between neighboring pixels ought to be increased.

Here, the image is regarded as a one-dimensional signal, and covariance is introduced.

$$C_{fg} = \lim_{x \to \infty} \frac{1}{2X} \sum_{x=-X}^{X} (f(x) - \mu_f)(g(x) - \mu_g) \quad \text{[Expression 1]}$$

$$\equiv E_x[(f(x) - \mu_f)(g(x) - \mu_g)]$$

where the covariance is $C_{fg}$, the image signals are f(x) and g(x), $\mu_f$ and $\mu_g$ are spatial average values, which are given by $\mu_f = E_x[f(x)]$ and $\mu_g = E_x[g(x)]$, respectively.

Expression 1 produces a value nearer to the variance of f(x) or g(x), as f(x) and g(x) get closer to each other, and produces 0 as f(x) and g(x) become apart. The covariance $C_{fg}$ quantifies the proximity of two waveforms.

In the case of compressing an image, the image signal is expressed only by f(x), and it is necessary to quantify the proximity of neighboring pixels.

Accordingly, it is assumed that g(x) is the signal produced by f(x) with a displacement of u (integer). Thus, g(x)=f(x+u) is assigned to Expression 1.

At this time, $E_x[f(x)]$ and $E_x[g(x)]=E_x[f(x+u)]$ become equal. Assuming that this value is µ, Expression 2 is obtained.

$$C_{ff}(u) = E_x[(f(x) - \mu)(f(x+u) - \mu)] \quad \text{[Expression 2]}$$

where $C_{ff}(u)$ is called an autocovariance.

Now, the autocovariance of an actual image signal f(x) is plotted on the basis of Expression 2.

In this regard, concerning $C_{ff}(u)$, attention should not be focused on whether the value is high or low, but should be focused on how fast the value is attenuated as moving away from the origin u=0.

Figure 2A:
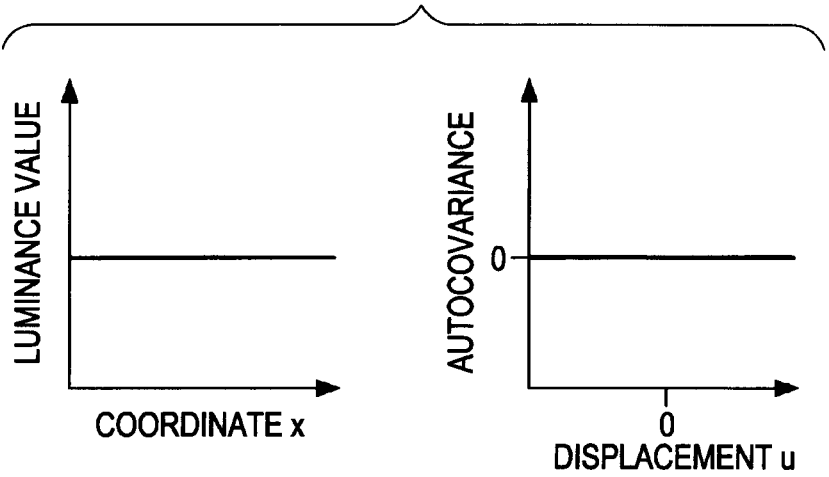
FIG. 2 is an explanatory diagram of coding efficiency improvement by motion-blur addition in the embodiment.

First, FIG. 2A shows the case where a signal with no change at all is applied. In this case, it is easily understood that $C_{ff}(u)$ becomes 0 from the definition of Expression 2.

Figure 2B:
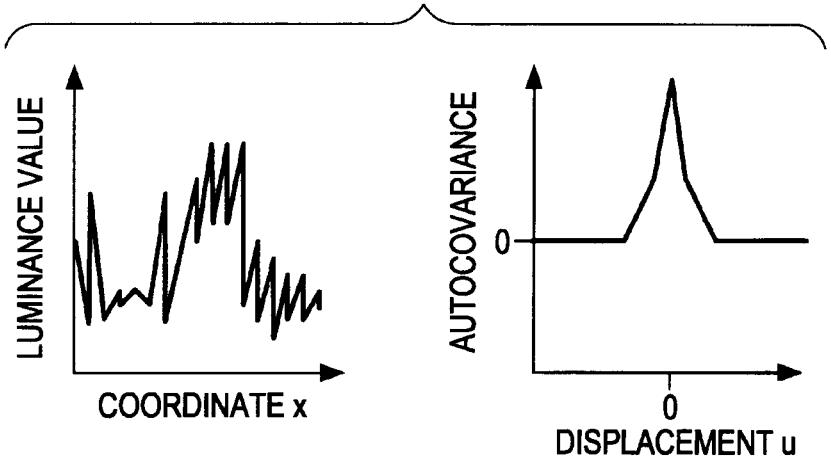

Next, FIG. 2B shows the autocovariance in the case where an image signal f(x) with sharp fluctuations is applied. If the signal fluctuates sharply, the autocovariance soon converges at 0 from u=0, because positive values and negative values cancel with each other with a change in the displacement of u.

Figure 2C:
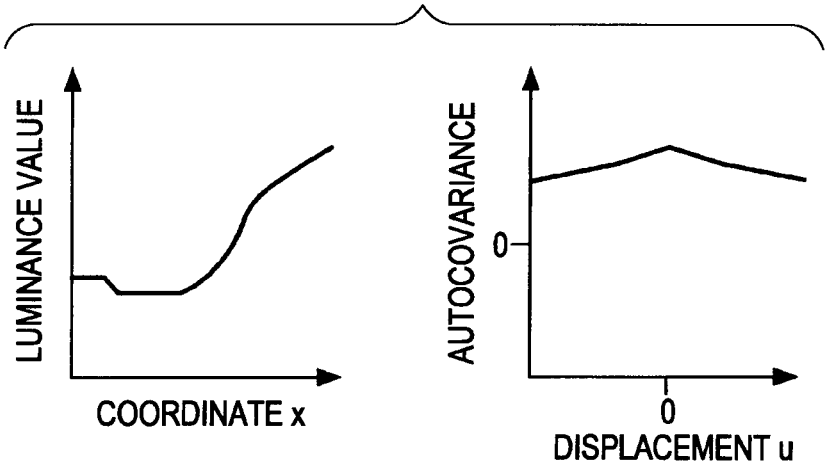

Next, FIG. 2C shows the autocovariance in the case where an image signal f(x) with a gradual change is applied.

The signal changes gradually, and thus the autocovariance is attenuated gradually from u=0, because there is a correlation between pixels with a change in the displacement of u.

That is to say, the autocovariance becomes close to a discrete delta function which accelerates convergence at 0 from u=0 in the case of a low correlation between pixels.

When a low-pass filter is applied, it is apparent that a change between pixels becomes gradual. When a change between pixels becomes gradual, a correlation between the pixels becomes high.

When the correlation between the pixels becomes high, as shown in the examples in FIGS. 2B and 2C, a pixel signal is changed from the pixel signal with the autocovariance having a small correlation between the pixels in FIG. 2B to the pixel signal having a large correlation between the pixels shown in FIG. 2C, and thus the compression rate is said to be increased.

The above is a description of an increase in the compression efficiency by the application of a low-pass filter to moving image data. The same thing can be applied to the motion-blur addition processing.

Next, FIG. 3 illustrates a configuration in which the image processing apparatus 1 includes a motion-blur addition processing section 11 and a motion-vector generation processing section 12. Alternatively, FIG. 1 illustrates a configuration in which the image processing apparatus 100 includes the motion-blur addition processing section 11, the motion-vector generation processing section 12, and a coding processing section 2.

FIG. 3 is an example of the configuration using a motion vector VD as an example of the motion information MI in FIG. 1.

The motion-vector generation processing section 12 generates the motion vector VD of each area (an area is a pixel unit or a pixel block unit including a plurality of pixels) of each frame of the input moving image data ID.

The motion-blur addition processing section 11 adaptively performs filter processing on the input moving image data ID (for each frame or for each divided area) using the motion vector VD so that the motion-blur addition processing is performed.

Motion-blurred image data BD having been subjected to the motion-blur addition processing is input into the coding processing section 2, and is subjected to coding processing, such as the MPEG compression, etc., for example.

In this case, the coded data ED, produced by compression-processing the motion-blurred image data BD, has also improved compression efficiency compared with the coded data produced by directly inputting the moving image data ID into the coding processing section 2.

Figure 4:
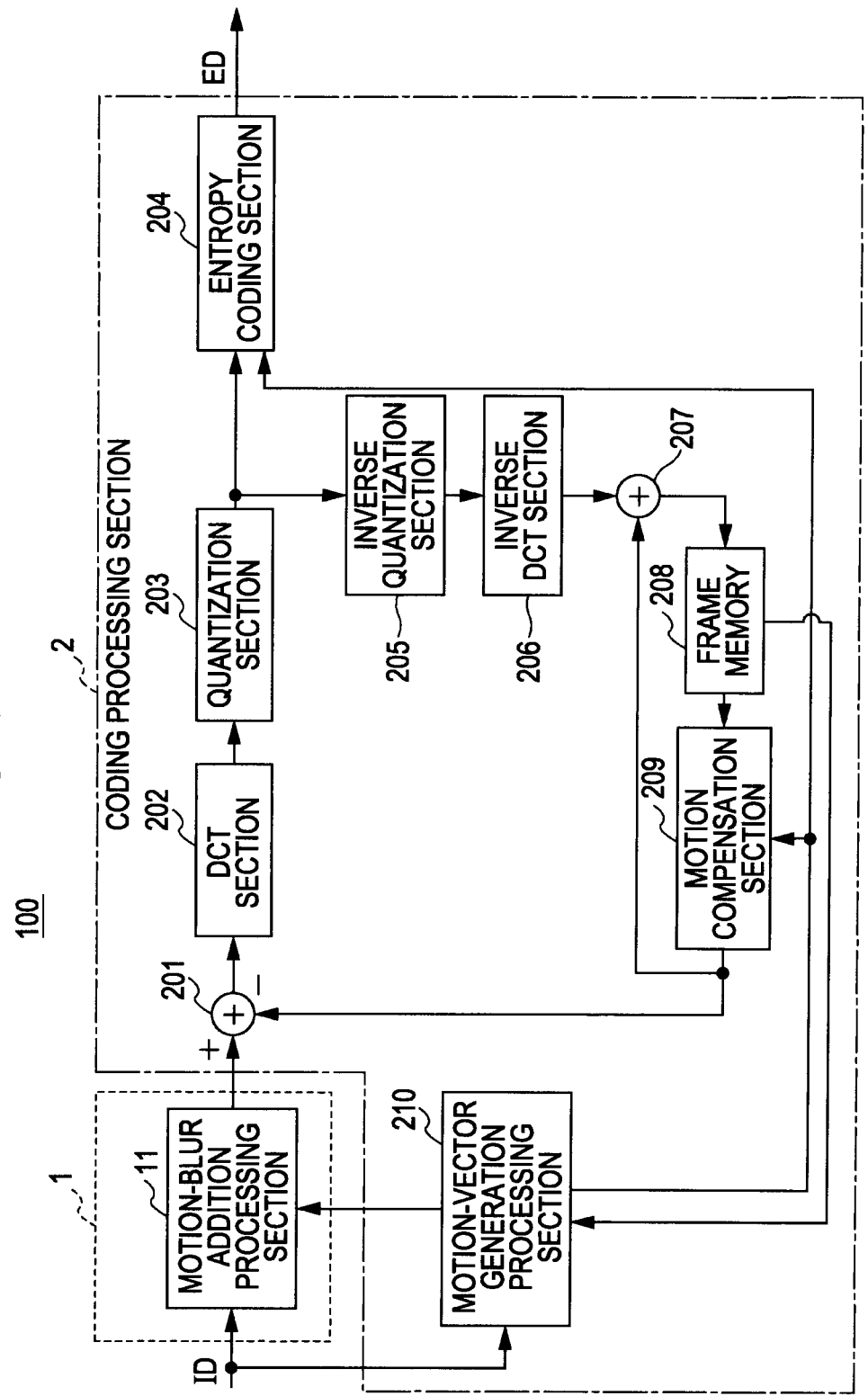
FIG. 4 is a block diagram of an example of still another configuration of the first image processing apparatus according to the embodiment.

Next, FIG. 4 illustrates an example of the configuration in which the motion vector used in the coding processing section 2 is used in the motion-blur addition processing.

In FIG. 4, as a configuration in the coding processing section 2, a basic MPEG coding processing block is shown.

The moving image data ID input into the motion-blur addition processing section 11 is also input into a motion-vector generation processing section 210 in the coding processing section 2.

The motion-vector generation processing section 210 detects a motion between two adjacent pictures, generates a motion vector, and outputs the motion vector to a motion compensation section 209 and an entropy coding section 204. A subtraction section 201 subtracts the image data having been subjected to the motion compensation by the motion compensation section 209 from the moving image data input from the motion-blur addition processing section 11, and outputs the result to a DCT processing section 202.

The DCT processing section 202 performs DCT processing on the moving image data input from the subtraction section 201, generates a DCT coefficient, and outputs the DCT coefficient to a quantization section 203.

The quantization section 203 quantizes the DCT coefficient input from the DCT section 202 to generate the quantization data, and outputs the quantization data to the entropy coding section 204 and an inverse quantization section 205. The inverse quantization section 205 inversely quantizes the quantization data input from the quantization section 203 to generate a DCT coefficient, and outputs the DCT coefficient to an inverse DCT section 206.

The inverse DCT section 206 performs inverse DCT processing on the DCT coefficient input from the inverse quantization section 205 to generate image data, and outputs the image data to an addition section 207.

The addition section 207 adds the image data motion-compensated by the motion compensation section 209 and the image data input from the inverse DCT section 206 to output the result to the frame memory 208. The image data temporarily stored in the frame memory 208 is output to the motion compensation section 209, and is supplied to the motion-vector generation processing section 210 as the image data of the past frame to be used for motion vector generation.

The motion compensation section 209 performs motion compensation on the image data input from the addition section 207 through the frame memory 208 on the basis of the motion vector input from the motion-vector generation processing section 210, and outputs the result to the addition section 207 and the subtraction section 201.

The entropy-coding section 204 performs variable-length coding processing on the quantization data input from the quantization section 203 to generate compressed image data (coded data ED), and outputs the coded data.

In the configuration in FIG. 4, the motion vector generated by the motion-vector generation processing section 210, that is to say, the motion vector to be used for the MPEG compression processing, is supplied to the motion-blur addition processing section 11. The motion-blur addition processing section 11 performs motion-blur addition processing using the supplied motion vector.

As in this example, in the prediction coding on the basis of image motion information, like the MPEG system, it is thought that the motion vector generated in the coding processing is used.

In this regard, although the figure is omitted, for example, as shown in FIG. 3, the motion vector VD generated by the motion-blur addition processing section 11 for the motion-blur addition processing may be supplied to the coding processing section 2, and the coding processing section 2 may perform the prediction coding processing using the motion vector VD.

In the first image processing apparatus 1 (or 100), motion-blur addition is performed by image processing in which a low-pass filter simulating a motion blur caused by an exposure time period at shooting time is adaptively applied to an image using motion information in the moving image. Thereby, it is possible for a viewer of a moving image to have a natural image quality and to improve the coding efficiency.

It becomes possible for a viewer of a moving image to have a more natural image quality and to improve the coding efficiency by applying a low-pass filter simulating a motion blur compared with the case of applying a spatially uniform low-pass filter.

Also, the filtering is performed adaptively for each area by referring to motion information, and thus, in particular, in an area in which a subject is moving at a high speed, it is expected that the image quality is easily maintained and the coding efficiency is improved even if an intensive low-pass filter is applied in a wide area compared with the case of applying a spatially uniform low-pass filter.

Moreover, the first image processing apparatus 1 (or 100) allows the reduction of jerkiness.

1.2 Motion-Vector Generation Processing Section

As described above, various configurations are considered for the first image processing apparatus 1 (or 100). In the following, on the basis of the example of the configuration shown in FIG. 3, a description will be given of an example of the detailed configuration of the motion-vector generation processing section 12 and the motion-blur addition processing section 11.

Figure 5:
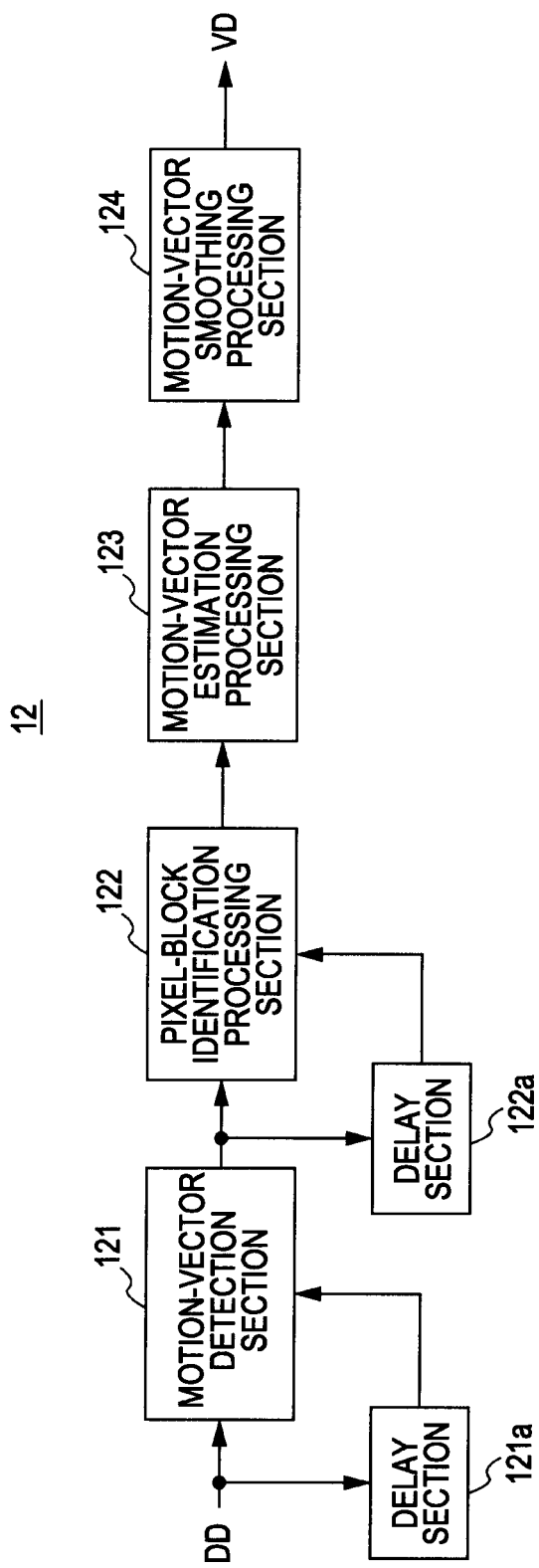
FIG. 5 is a block diagram of the motion-vector generation processing section according to the embodiment.

Here, first, a description will be given of the configuration and the operation of the motion-vector generation processing section 12 using FIGS. 5 and 6.

The motion-vector generation processing section 12 generates a motion vector for each area of a pixel or a pixel block with high precision. Specifically, as shown in FIG. 5, the motion-vector generation processing section 12 has a motion-vector detection section 121, a pixel-block identification processing section 122, a motion-vector estimation processing section 123, a motion-vector smoothing processing section 124, and delay sections 121a and 122a.

The motion-vector detection section 121 detects a motion vector from a processing target frame and the immediately preceding frame.

The pixel-block identification processing section 122 compares the motion vector of the processing target frame and the motion vector of the immediately preceding frame, and identifies pixel blocks having a high correlation.

The motion-vector estimation processing section 123 estimates a motion vector of the other pixel blocks from the motion vector of the pixel blocks identified by the pixel-block identification processing section 122.

The motion-vector smoothing processing section 124 performs smoothing processing on the motion vector.

The moving image data ID input as shown in FIG. 3 is supplied to the motion-vector detection section 121 and the delay section 121a which delays the moving image data ID by one frame.

The motion-vector detection section 121 determines the supplied moving image data ID to be a processing target frame. And the motion vector of the processing target frame is detected for each pixel block, for example, from the processing target frame and the immediately preceding frame having a one-frame delay by the delay section 121a.

In this regard, if the processing of the motion-vector detection section 121 is implemented by software, a motion vector ought to be detected for each pixel block using a general block matching method.

The motion vector detected by the motion-vector detection section 121 is supplied to the pixel-block identification processing section 122 and the delay section 122a. The delay section 122a delays the moving image data ID by one frame.

The pixel-block identification processing section 122 compares the motion vector of the processing target frame supplied from the motion-vector detection section 121 and the motion vector of the immediately preceding frame delayed by the delay section 122a for each pixel block as shown below, and identifies the pixel block having a high correlation from the comparison result.

Specifically, the pixel-block identification processing section 122 calculates the vector correlation coefficient σ of the pixel block by the following expression (Expression 3) assuming that a motion vector of one pixel block of the processing target frame is (x, y), the motion vector of the immediately preceding frame corresponding to this is (x', y'), and a correlation determination coefficient determined optionally is α.

$$\sigma = \begin{cases} 1: \begin{cases} \alpha \times x < x' < (2-\alpha) \times x \\ \& \\ \alpha \times y < y' < (2-\alpha) \times y \\ \vdots \\ (\text{case}) x = 0 \\ -(1-\alpha) \times y < x' < (1-\alpha) \times y \\ (\text{case}) y = 0 \\ -(1-\alpha) \times x < y' < (1-\alpha) \times x \end{cases} \\ 0: \text{Others} \end{cases} \quad [\text{Expression 3}]$$

In this regard, the correlation determination coefficient α has the domain thereof as 0<α<1. The vector correlation coefficient σ is calculated to be close to 1 as the value of α becomes high.

The pixel-block identification processing section 122 calculates the vector correlation coefficient σ of each pixel block from the above-described expression (Expression 3), and identifies a certain pixel block having a vector correlation coefficient σ of 1 as a pixel block having a motion vector with a high correlation.

The motion-vector estimation processing section 123 estimates the motion vector of the pixel block whose vector correlation coefficient σ is 0 from the motion vector of the pixel block whose vector correlation coefficient σ is identified as 1 by the pixel-block identification processing section 122.

That is to say, the motion-vector estimation processing section 123 regards the pixel block whose vector correlation coefficient σ is determined to be 1 by the pixel-block identification processing section 122 as having a valid motion vector. The motion-vector estimation processing section 123 updates the motion vector of the other pixel blocks, that is to say, the pixel block whose vector correlation coefficient σ is 0 and having an invalid motion vector.

Figure 6:
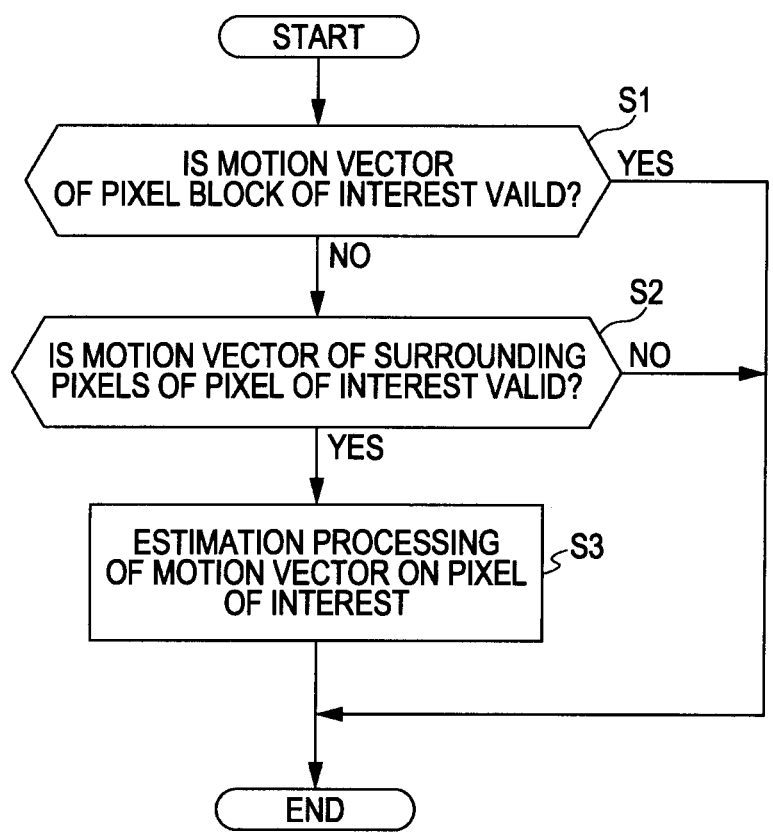
FIG. 6 is a flowchart of the motion-vector generation processing section according to the embodiment.

A detailed description will be specifically given of the processing of the motion-vector estimation processing section 123 with reference to FIG. 6.

In step S1, the motion-vector estimation processing section 123 determines whether the vector correlation coefficient σ of the current processing target pixel block (hereinafter, referred to as a pixel block of interest) in the processing target frame is 1 or 0. That is to say, the motion-vector estimation processing section 123 determines whether the motion vector of the pixel block is valid or not. Next, in the motion-vector estimation processing section 123, if the motion vector of the pixel block is valid, the value of the motion vector is not updated, and the processing is terminated, whereas if the motion vector of the pixel block is not valid, the processing proceeds to step S2.

In step S2, concerning a pixel block of interest, the motion-vector estimation processing section 123 determines whether there is a surrounding pixel block having a valid vector around the pixel block of interest. Specifically, the motion-vector estimation processing section 123 determines whether there is a valid motion vector in eight pixel blocks adjacent to the pixel block of interest as surrounding pixel blocks. If there is a valid motion vector, the processing proceeds to step S3. If there is not a valid motion vector, the motion vector of the pixel block of interest is not updated, and the processing is terminated.

Here, the reasons why estimation processing is not performed on a pixel block of interest having no valid motion vector using the surrounding pixel blocks located in more extensive areas are as follows.

The first reason is that although it is possible to perform estimation processing using the pixel blocks located in more extensive areas, the memory area for temporarily storing image data processed as the surrounding pixel blocks increases in order to complete the processing in a fixed period of time.

The second reason is that in the subsequent stage of the processing, it is possible to adequately compensate invalid motion vector by performing smoothing processing on the motion vector of the pixel block of interest using surrounding the pixel blocks in a wider area than the above-described eight adjacent pixel blocks in total.

In step S3, the motion-vector estimation processing section 123 estimates and updates the motion vector of the pixel block of interest only from the motion vector of the surrounding pixel blocks having a valid motion vector, and terminates the processing. The motion-vector estimation processing section 123 outputs the motion vector of the pixel block of interest to perform smoothing by a median filter inputting only the motion vectors of the surrounding pixel blocks having valid motion vectors as an example of the estimation processing.

The motion-vector estimation processing section 123 estimates the motion vector of the processing target frame for each pixel block as described above. Next, the motion-vector estimation processing section 123 supplies the motion vector including a motion vector identified by the pixel-block identification processing section 122 to the motion-vector smoothing processing section 124.

The motion-vector smoothing processing section 124 performs smoothing processing on the motion vector of each pixel block included in the processing target image. Specifically, the motion-vector smoothing processing section 124 inputs the motion vector of the pixel block of interest before the smoothing processing and the motion vector of the surrounding pixel blocks in a wider area than the above-described adjacent pixel blocks as input I (x+i, y+i) into a Gaussian function as shown below (Expression 4) to output the motion vector J (x, y) of the pixel block of interest after the smoothing processing.

$$J(x, y) = \left( \frac{\sum I(x+i, y+j) * e^{-\frac{r^2}{2\sigma^2} - \frac{(I(x+i,y+j)-I(x,y))^2}{t^2}}}{\sum e^{-\frac{r^2}{2\sigma^2} - \frac{(I(x+i,y+j)-I(x,y))^2}{t^2}}} \right)$$ [Expression 4]

where r denotes the distance between the pixel block of interest and each surrounding pixel block in a two-dimensional space, $\sigma^2$ denotes the variance of the distance r, $t^2$ denotes the variance of the motion vector. That is to say, $\sigma^2$ and $t^2$ are parameters optionally set as values expressing the degree of the smoothing.

The motion-vector smoothing processing section 124 performs the above-described smoothing processing on each pixel block included in the processing target frame, and supplies the motion vector VD to the motion-blur addition processing section 11.

In this manner, the motion-vector smoothing processing section 124 identifies the pixel block having a valid motion vector from individual pixel blocks included in the processing target frame, and estimates the other motion vectors from the valid motion vector. Thus, it is possible to generate a motion vector in accordance with the actual movement of a moving object with high precision.

In this regard, in the motion-vector generation processing section 12, the motion vector detected by the motion-vector detection section 121 may be directly supplied to the motion-vector smoothing processing section 124 to be subjected to the smoothing processing without going through the pixel-block identification processing section 122 and the motion-vector estimation processing section 123. In such a case, it is also possible to generate a motion vector in accordance with the actual movement of a moving object with high precision compared with the motion vector as the above-described coding information.

1.3 Motion-Blur Addition Processing Section

Next, a description will be given of an example of the configuration of the motion-blur addition processing section 11.

In this regard, two examples, an example of the configuration in FIG. 7 and an example of the configuration in FIG. 12 will be described as the motion-blur addition processing section 11.

First, a description will be given of the motion-blur addition processing section 11 as an example of FIG. 7.

Figure 7:
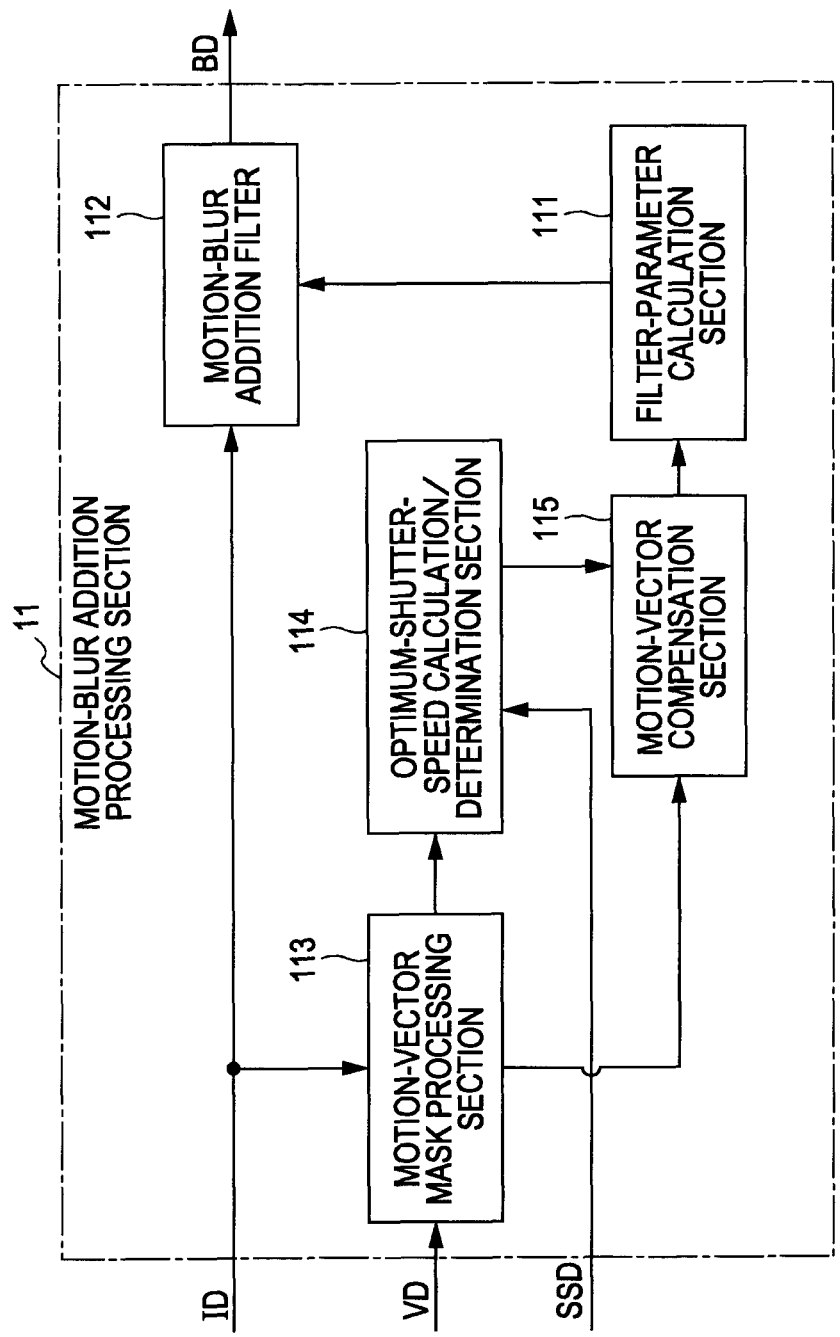
FIG. 7 is a block diagram of the motion-blur addition processing section according to the embodiment.

As shown in FIG. 7, the motion-blur addition processing section 11 includes a motion-vector mask processing section 113 which generates motion-vector mask information identifying an image area to which a motion blur is added.

Also, the motion-blur addition processing section 11 includes an optimum-shutter-speed calculation/determination section 114 which calculates a shutter speed (hereinafter referred to as an optimum shutter speed information) suitable for the motion vector, and compares the optimum shutter speed information and the shutter speed information at the time of the actual shooting of the image to perform the determination processing described below.

Also, the motion-blur addition processing section 11 includes a motion-vector compensation section 115 which compensates the motion vector on the basis of the determination result of the optimum-shutter-speed calculation/determination section 114.

Also, the motion-blur addition processing section 11 includes a filter-parameter calculation section 111 which calculates a filter parameter for adding a motion vector in accordance with each pixel of the processing target frame.

Also, the motion-blur addition processing section 11 includes a motion-blur addition filter 112 which performs motion-blur filter processing on the pixel value of each pixel of the processing target frame.

Here, although it is possible to perform all the processing for each pixel, in order to reduce the calculation processing load, the motion-blur addition processing section 11 performs the processing of the motion-vector mask processing section 113, the optimum-shutter-speed calculation/determination section 114, and the motion-vector compensation section 115 for each pixel block.

Also, the filter-parameter calculation section 111 and the motion-blur addition filter 112 perform the filter processing for adding a motion blur to the moving image data ID, and thus performs the processing not for each pixel block, but for each pixel.

Figure 8:
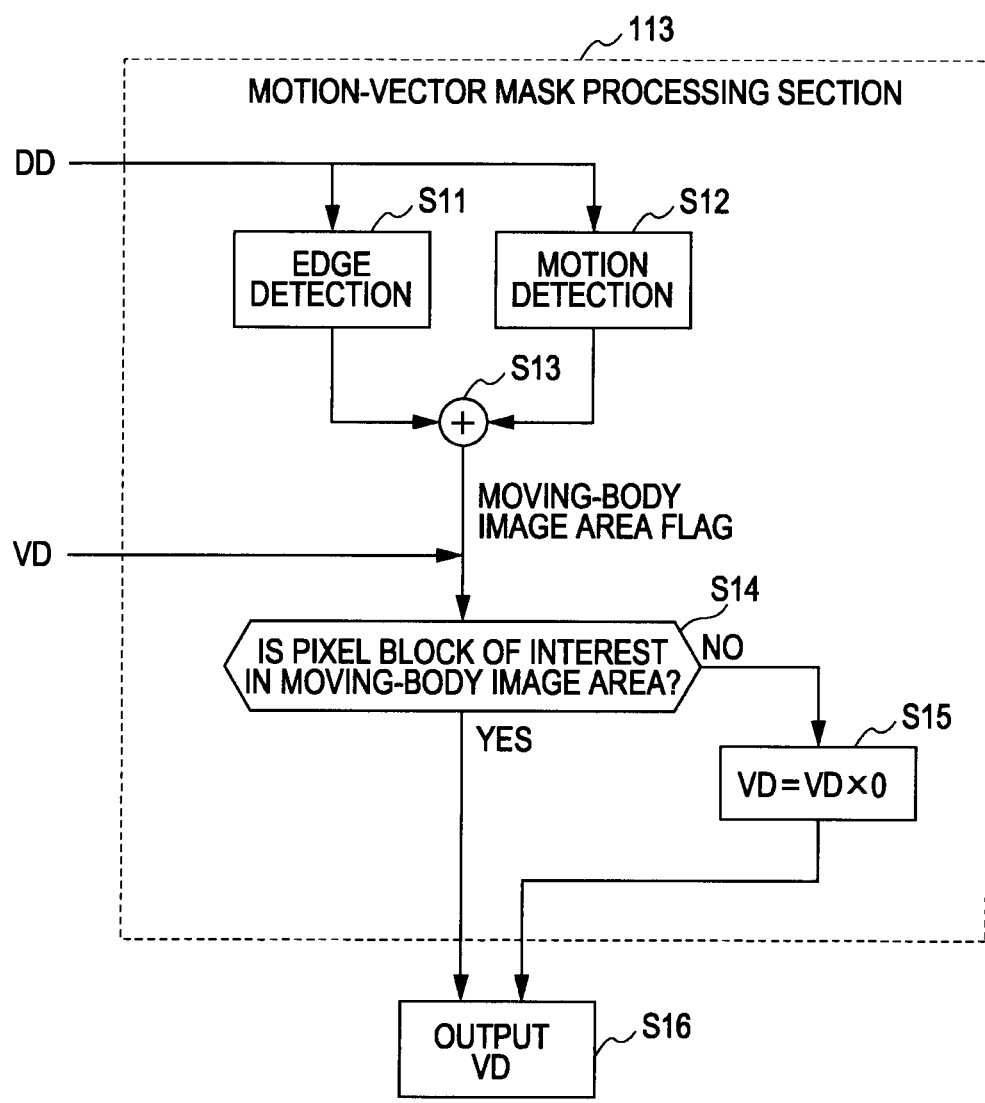
FIG. 8 is a flowchart of the processing of the motion-vector mask processing section according to the embodiment.

The motion-vector mask processing section 113 identifies the image area to which a motion blur is added out of the processing target frame, and thus performs the mask processing as shown in FIG. 8 on the motion vector VD supplied from the motion-vector generation processing section 12 for each pixel block. And the motion-vector mask processing section 113 supplies the motion vector having undergone the mask processing for each pixel block to the optimum-shutter-speed calculation/determination section 114 and the motion-vector compensation section 115.

The image area, which is necessary to be provided with a motion blur and is liable to suffer from jerkiness, is concentrated on moving-object image areas and edge-surrounding image areas in a screen in particular.

Thus, by the processing shown in FIG. 8, the motion-vector mask processing section 113 outputs only the motion vector of the pixel block surrounding an edge, having a high space contrast, and which is liable to suffer from jerkiness.

That is to say, in step S11, the motion-vector mask processing section 113 detects an edge of an image from the input moving image data ID for each pixel block as processing for identifying an area having a high space contrast in the processing target frame.

Also, in parallel with the processing of step S11, in step S12, the motion-vector mask processing section 113 performs processing for identifying a moving object area in the processing target frame. That is to say, the motion-vector mask processing section 113 calculates the difference between frames for each pixel block so as to detect a moving-object image area.

In step S13, the motion-vector mask processing section 113 determines whether the area has been detected as an area liable to suffer from jerkiness for each pixel block by the processing either the above-described step S11 or step S12, or both of the steps. The motion-vector mask processing section 113 sets the mask processing flag to '1' for the pixel block determined to be an area liable to suffer from jerkiness. Also, the motion-vector mask processing section sets the mask processing flag to "0" for the pixel block determined not to be an area liable to suffer from jerkiness.

In step S14, the motion-vector mask processing section determines whether the motion vector VD supplied from the motion-vector generation processing section 12 is the motion vector VD of the pixel block having the above-described flag set as "1".

The motion-vector mask processing section 113 outputs the motion vector of the pixel block having the flag set as "1" to the optimum-shutter-speed calculation/determination section 114, and the motion-vector compensation section 115 in the subsequent-stage without changing the value.

Also, the motion-vector mask processing section 113 performs mask processing, which changes the value of the motion vector to 0 or invalidates the motion vector, on the motion vector of the pixel block having the flag set as "0" in step S15, and outputs the motion vector to the optimum-shutter-speed calculation/determination section 114, and the motion-vector compensation section 115 in the subsequent-stage.

Next, a description will be given of the processing according to the optimum-shutter-speed calculation/determination section 114 and the motion-vector compensation section 115 with reference to FIG. 9.

Figure 10:
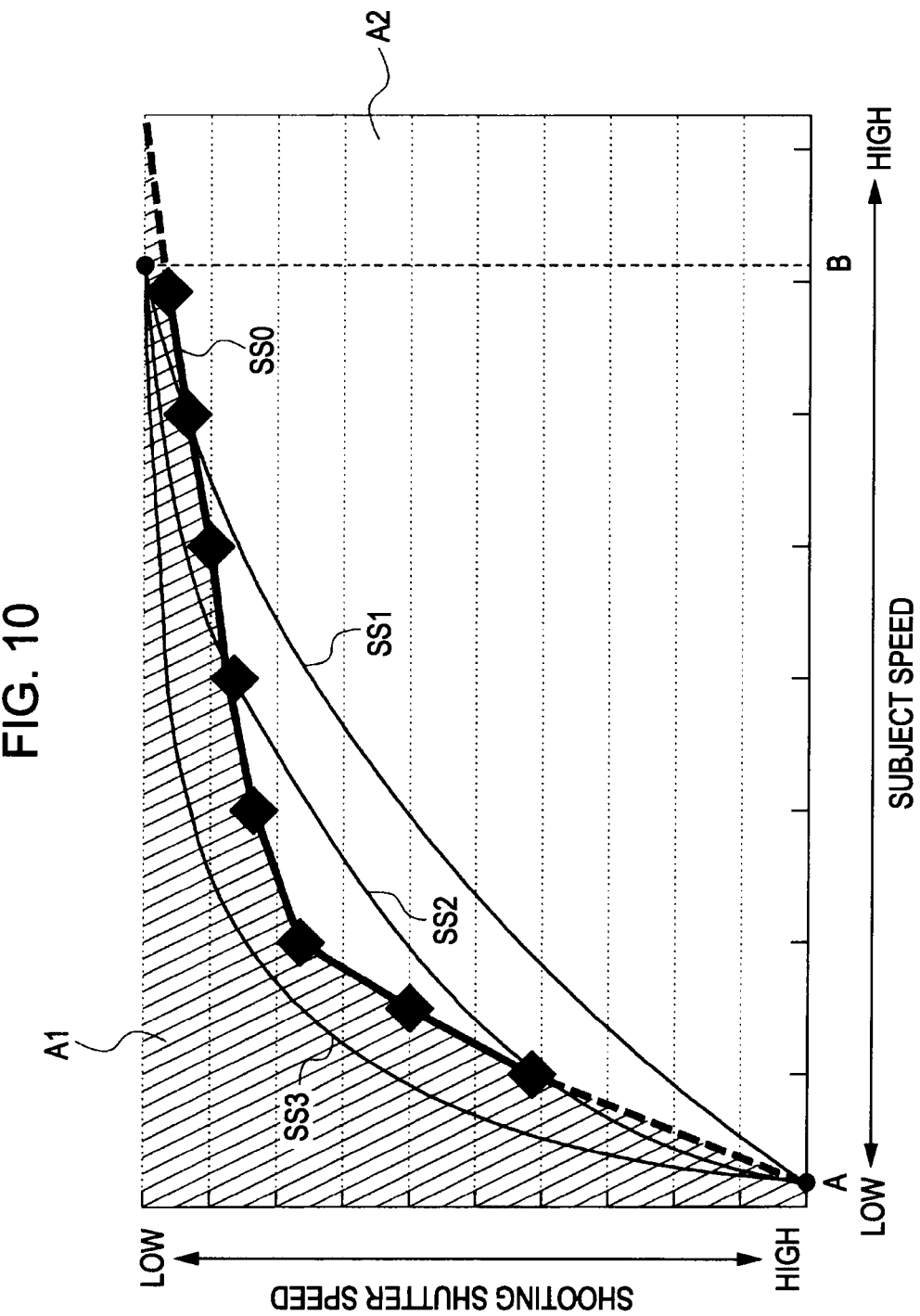
FIG. 10 is an explanatory diagram on an optimum shutter speed according to the embodiment.

In step S31, the optimum-shutter-speed calculation/determination section 114 calculates an optimum shutter speed in accordance with the motion vector of each pixel block of the processing target frame on the basis of an evaluation index as shown in FIG. 10, for example.

Here, FIG. 10 is a graph showing a subject speed indicating the movement speed of a moving body detected as a motion vector and an optimum shutter speed curve in accordance with the subject speed. Here, an optimum shutter speed is a shutter speed at which jerkiness is difficult to be perceived in a visual characteristic in accordance with the movement speed of a subject, and at which a blur, in which details of the subject is lost or blurred by a motion blur being too much added, is difficult to be perceived. That is to say, if the subject is shot at a shutter speed higher than the optimum shutter speed, a determination can be made that jerkiness occurs. On the other hand, if the subject is shot at a shutter speed lower than the optimum shutter speed, a determination can be made that a blur occurs in the captured image.

Thus, the optimum-shutter-speed calculation/determination section 114 calculates an optimum speed in accordance with the motion vector of each pixel by relating the motion vector of each pixel block to the subject speed in FIG. 10.

In this regard, the optimum shutter speed curve SS0 shown by a solid line in FIG. 10 is an example showing a relationship between any subject speed and an optimum shutter speed, and specifically is a curve connecting experiment result values obtained on the basis of psychological experiments.

Here, a motion blur area A1 shown in FIG. 10 is an area determined to include a motion blur due to the movement of a subject too much on the basis of the optimum shutter speed curve SS0. In the same manner, a jerkiness area A2 is an area determined not to include a motion blur due to the movement of a subject, and to include jerkiness in the visual characteristic on the basis of the optimum shutter speed curve SS0.

In order to obtain an optimum shutter speed in accordance with the motion vector directly using the optimum shutter speed curve SS0 shown by the solid line, a table containing optimum shutter speeds in accordance with motion vectors at any intervals ought to be stored in a recording medium in advance, and the recording medium ought to be referenced.

Also, in the present embodiment, an optimum shutter speed in accordance with a motion vector may be calculated using a function approximating the optimum shutter speed curve shown by the solid line.

In this case, the optimum-shutter-speed calculation/determination section 114 calculates an optimum shutter speed SSD' by the approximation function of the optimum shutter speed curve shown by the following expression (Expression 5) assuming that the motion vector of a certain pixel block is v.

$$SSD' = \left(\frac{v-A}{B-A}\right)^{\gamma} \times (v-A) + A \qquad \text{[Expression 5]}$$

In this regard, individual parameters A, B, and γ in Expression 5 ought to be suitably set in accordance with the curve form of the optimum shutter speed shown in FIG. 10. As a specific example of a shutter speed curve, FIG. 10 shows curve forms SS1 to SS3 when the values A and B are fixed, and γ is changed in three levels among the individual parameters in Expression 5.

Figure 9:
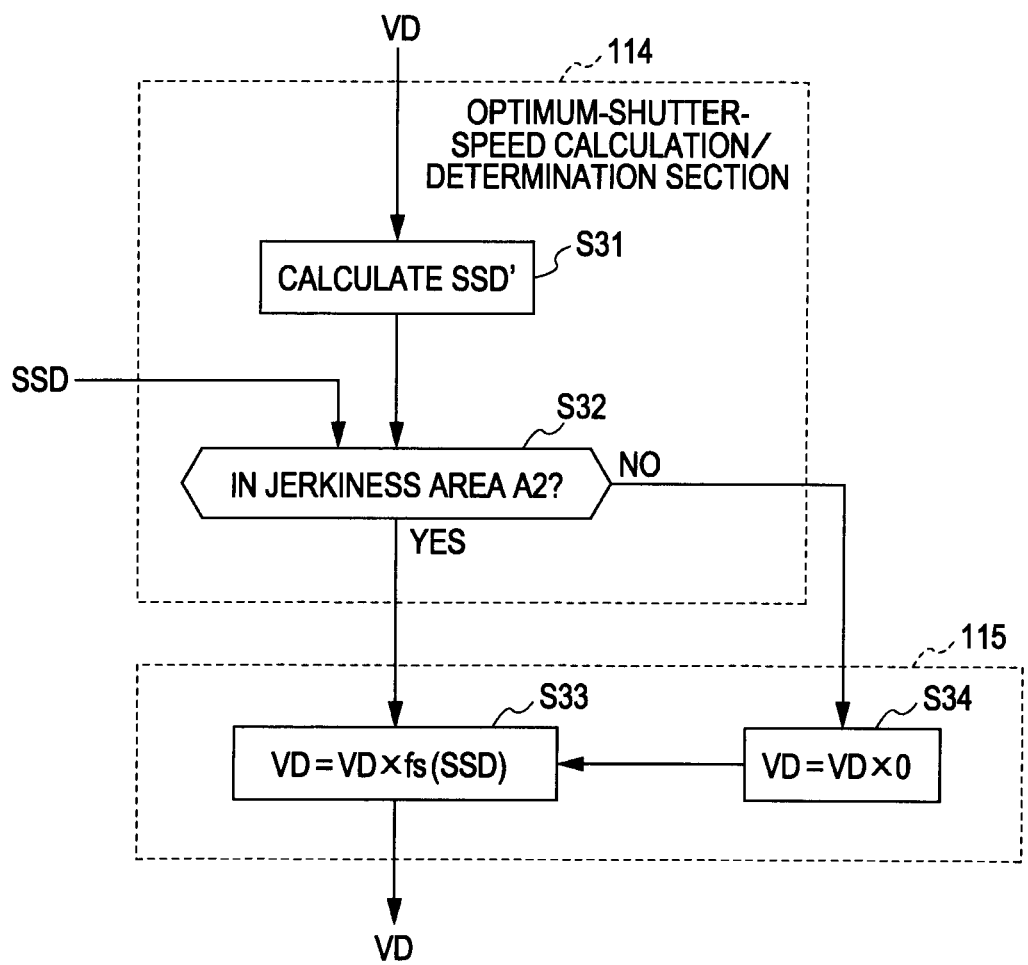
FIG. 9 is a flowchart of the processing of the optimum-shutter-speed calculation/determination section and the motion-vector compensation section.

After the optimum shutter speed SSD' in accordance with the motion vector is calculated, in step S32 in FIG. 9, the optimum-shutter-speed calculation/determination section 114 compares the optimum shutter speed SSD' and the shutter speed SSD at actually shot time, and a determination is made whether the shutter speed falls in the jerkiness area A2 shown in FIG. 10 for each pixel block.

In this regard, the shutter speed SSD at actually shot time ought to be a value added to the moving image data ID as meta data, for example. Also, in the case where the image processing apparatus 1 (100) of the embodiment is included in an imaging apparatus, the shutter speed can be obtained as shutter speed information at shooting time by that apparatus.

From the determination result of step S32, in the pixel block of the current processing target, if the shutter speed SSD is higher than the optimum shutter speed SSD', and falls in the jerkiness area A2, in the motion-vector compensation section 115, the processing proceeds to step S33.

Also, in the pixel block of the current processing target, if the shutter speed SSD is lower than the optimum shutter speed SSD', and does not fall in the jerkiness area A2, in the motion-vector compensation section 115, the processing proceeds to step S34.

In step S33, jerkiness occurs in the pixel block of the processing target, the motion-vector compensation section 115 performs processing for multiplying the value of the motion vector and a function fs (SSD) which increases the value and converges at 1 as the shutter speed SSD increases.

In this regard, the motion-vector compensation section 115 may perform multiplication processing using fs (VD) having a variable, the motion vector VD, or using fs (SSD, VD) having two variables, the shutter speed SSD and the motion vector VD.

In step S34, jerkiness does not occur in the pixel block of the processing target, and thus the motion-vector compensation section 115 performs mask processing, for example, by multiplying the motion vector and 0 in order to invalidate the motion vector.

In this manner, the optimum-shutter-speed calculation/determination section 114 determines whether jerkiness occurs or not in consideration of the shutter speed SSD at the time of actually shooting the moving image being the processing target. The motion-vector compensation section 115 performs compensation processing for adding an adequate motion blur to the motion vector of the pixel block determined to have jerkiness. Thus, the motion-blur addition processing performed by the motion-blur addition filter 112 contributes to the moving image becoming more natural in the visual characteristic.

The filter-parameter calculation section 111 calculates the filter parameters as shown below for each pixel in order to add a motion blur to each pixel included in the processing target frame.

First, the filter-parameter calculation section 111 determines the pixel having valid motion vector information to be a pixel of interest, and identifies the pixel (hereinafter, referred to as a parameter-calculation target pixel) located on the motion vector of each pixel of interest. Next, the filter-parameter calculation section 111 calculates the filter parameter in accordance with the relative position of the parameter-calculation target pixel identified for the pixel of interest as shown below.

Figure 11:
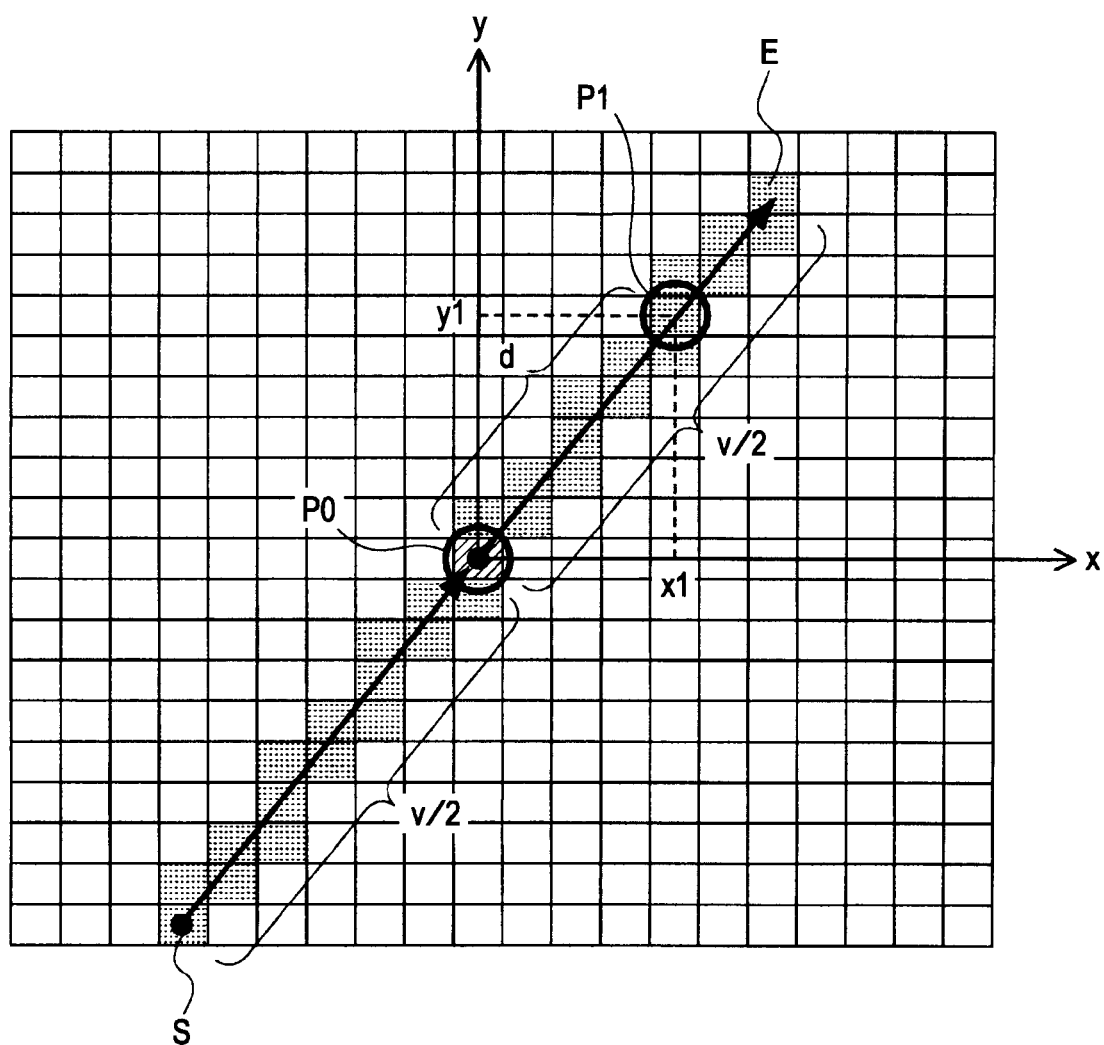
FIG. 11 is an explanatory diagram of the processing of the filter-parameter calculation section according to the embodiment.

That is to say, as shown in FIG. 11, the filter-parameter calculation section 111 identifies all the pixels located on the vector having the position of the pixel of interest P0 at the middle point of a start point S and an end point E of the motion vector as the parameter-calculation target pixel. In this regard, as shown in FIG. 11, an absolute value v is the absolute value of the motion vector of the pixel of interest.

Next, the filter-parameter calculation section 111 calculates the intensity σ of the motion blur addition by the following Expression 6 in accordance with the absolute value v of the motion vector and the distance d between the position of the pixel of interest P0 and the pixel position of the parameter-calculation target pixel P1 identified by the above-described processing.

$$\sigma = -0.5 \times (d - 0.5)^2 + 0.5 \times \left(\frac{v}{2}\right)^2 \qquad \text{[Expression 6]}$$

Here, Expression 6 is set such that the value of the intensity σ, in the expression, to the second power becomes the variance of the Gaussian function of the motion-blur addition filter 112 in the subsequent stage.

Also, the filter-parameter calculation section 111 calculates an angle direction θ for adding the motion blur by the following Expression 7 on the assumption that the pixel of interest P0 is the origin, and a coordinate point of each parameter-calculation target pixel P1 on a rectangular coordinate plane x-y is (x1, y1).

$$\theta = \tan^{-1}\left(\frac{y_1}{x_1}\right) \qquad \text{[Expression 7]}$$

In this manner, the filter-parameter calculation section 111 identifies the parameter-calculation target pixel from the motion vector of the pixel of interest, and sets the parameter information (σ, θ), and supplies the parameter information to the motion-blur addition filter 112 for each processing target frame.

In this regard, in the processing according to the filter-parameter calculation section 111, a parameter-calculation target pixel is sometimes duplicately identified for a certain pixel. In this case, in order to simplify the processing, for example, out of the duplicately identified parameter information, information having σ of greater value ought to be the parameter information of the pixel. Also, the filter-parameter calculation section 111 performs smoothing processing, such as the Gaussian filter processing, the median filter processing, etc., on the parameter information (σ, θ) of each parameter-calculation target pixel so that the image quality of the moving image output from the motion-blur addition filter 112 in the subsequent stage can be increased.

The motion-blur addition filter 112 performs spatial filter processing in the processing target frame, as described below, on the pixel value of each pixel of the processing target frame of the input moving image data ID in accordance with the parameter information supplied from the filter-parameter calculation section 111.

In the present embodiment, the motion-blur addition filter 112 performs either one of or both of the first filter processing and the second filter processing, described below to output the image to which a motion blur has been added.

First, a description will be given of the first filter. In the first filter processing, the motion-blur addition filter 112 inputs the pixel value of the motion-vector addition target pixel before the motion-vector addition filter processing and the pixel value of the surrounding pixel located in the surroundings of the pixel, as input I (x+1, y+1), into a Gaussian function as shown by the following Expression 8, and outputs the pixel value J (x, y) of the pixel of interest after the filter processing.

$$J(x, y) = \left( \frac{\sum I(x+i, y+j) * e^{-\frac{r^2}{2\sigma^2}}}{\sum e^{-\frac{r^2}{2\sigma^2}}} \right) \quad \text{[Expression 8]}$$

In this regard, the surrounding pixel to be the input I (x+1, y+1) is set in accordance with the angle direction at which the motion vector is added. Also, r indicates the distance between the motion-vector addition target pixel and the surrounding pixel.

The motion-blur addition filter 112 performs the above-described filter processing on each pixel to which the parameter information (σ, θ) is set, out of the all the pixels included in the processing target frame, to update the pixel value. In this manner, the motion-blur addition filter 112 can supply the moving image data BD with reduced jerkiness to the coding processing section 2 in the subsequent stage.

In the surrounding pixels located in the surroundings of the pixel of interest include an area without motion originally, that is to say, a background area. It is not necessary to consider the surrounding pixels located in such a background area originally in order to add a motion blur to the pixel of interest. A method of processing in consideration of these points is the second filter processing described below.

That is to say, in the second filter processing, when the value of the motion vector of the pixel of interest is 0 or invalid, the motion-blur addition filter 112 inputs the pixel value I (x+i0, y+j0) of the pixel whose motion vector value is 0 or invalid out of the surrounding pixels located in the surroundings of the pixel of interest in place of the pixel value I (x, y) of the pixel of interest into the above-described Expression 8 to calculate the pixel value J (x, y) of the pixel of interest. In this manner, the motion-blur addition filter 112 outputs the image in which jerkiness is more naturally reduced in the visual characteristic than that of the first filter processing.

The motion-blur addition processing section 11 can output the moving image data BD having been subjected to the motion-blur addition processing as the example described above.

In particular, in the case of this example, the optimum-shutter-speed calculation/determination section 114 compensates the motion vector in accordance with the shutter speed information at the time of shooting a moving image so as to control the value of the motion-blur addition intensity σ calculated by the filter-parameter calculation section 111 in the subsequent stage. Accordingly, it is possible to add adequate motion blur in accordance with the shutter speed information at shooting time by the motion-blur addition filter 112, and thus it is possible to output the moving image data BD with more naturally reduced jerkiness in the human visual characteristic.

Next, a description will be given of an example of the configuration in FIG. 12 as an example of the configuration of the motion-blur addition processing section 11. As shown in FIG. 12, the motion-blur addition processing section 11 may include the filter-parameter calculation section 111 and the motion-blur addition filter 112. That is to say, the configuration may be a configuration in which processing blocks related to motion vector compensation are removed from the configuration of FIG. 7.

As described above, in the present embodiment, the moving image data ID is subjected to motion-blur addition processing in the preceding stage of the coding processing section 2. One of the purposes thereof is to improve the coding efficiency.

And it is possible to optimize the degree of addition of the motion blur in accordance with the perception characteristic by having the configuration as that of the above-described FIG. 7. However, if a greater importance is given to the coding efficiency, it is not necessary to have that configuration. In that case, the configuration in FIG. 12 may be used.

Figure 12:
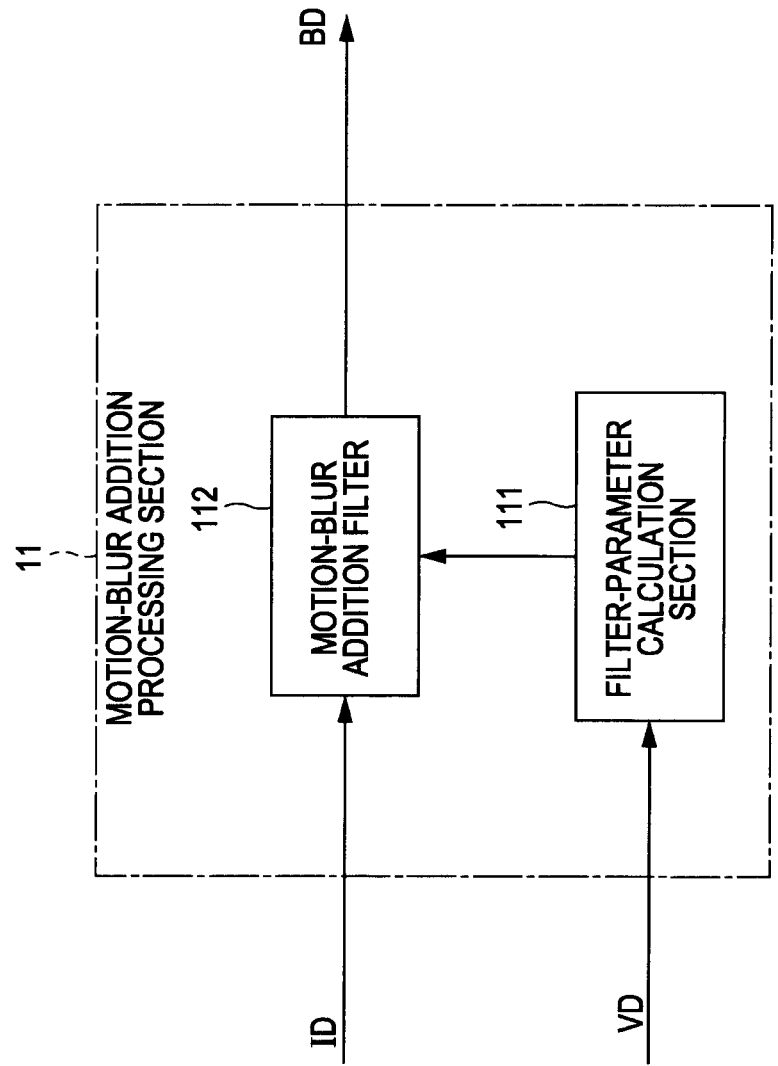
FIG. 12 is another block diagram of the motion-blur addition processing section according to the embodiment.

In the example of the configuration of FIG. 12, the motion vector VD supplied from the motion-vector generation processing section 12 is directly input into the filter-parameter calculation section 111.

The filter-parameter calculation section 111 calculates the filter parameter by performing the same processing as described above using the not-compensated motion vector VD. And the motion-blur addition filter 112 performs the above-described motion-blur addition processing on the basis of the filter parameter.

With this configuration, a motion blur is added faithfully to the size of the motion vector detected by the motion-vector generation processing section 12.

Regarding the second image processing apparatus 4 (400) described later, it is possible to perform faithful motion-blur reduction processing more easily in this manner.

Descriptions have been given of the configurations and the operations of the motion-blur addition processing section 11 with reference to FIGS. 7 and 12. However, various configurations and operations can be considered in addition to these.

In place of the spatial filter processing for adding a motion blur to each unit image using the motion vector, the motion-blur addition processing section 11 may add a motion blur to the image data using the other motion information.

For example, the addition of a motion blur to the moving image data ID may be processed by performing the filter processing in time, that is to say, a plurality of frames are overlapped for one frame so that a motion blur is added to the moving image data ID. In this case, the motion-blur addition processing section 11 detects a moving body image area by the difference between the frames as motion information instead of the motion vector. And the information indicating the detected moving body image area is compensated on the basis of the shooting information, and then is subjected to the filter processing in time using the motion information. Thereby, it is possible to add a motion blur adequately in accordance with the shutter speed information, etc., at shooting time.

2. The Second Image Processing Apparatus 2.1 Example of the Configuration of the Image Processing Apparatus Next, a description will be given of the second image processing apparatus as an embodiment of the present invention. The second image processing apparatus is an image processing apparatus which performs decoding and motion-blur reduction processing on the moving image data transmitted from the first image processing apparatus described above, that is to say, the moving image data ED having been subjected to the motion-blur addition processing and the coding processing (hereinafter referred to as "coded moving image data ED").

A description will be given of an example of the configuration of the second image processing apparatus with reference to FIGS. 13, 14, and 15.

In this regard, a processing block in each figure indicates a logical constituent element, and the individual processing blocks may be contained in a same casing, or may also be contained in different casings. In each figure, an image processing apparatus 4 surrounded by a broken line or an image processing apparatus 400 surrounded by a broken line can be thought as the configuration of the second image processing apparatus according to an embodiment of the present invention.

Figure 13:
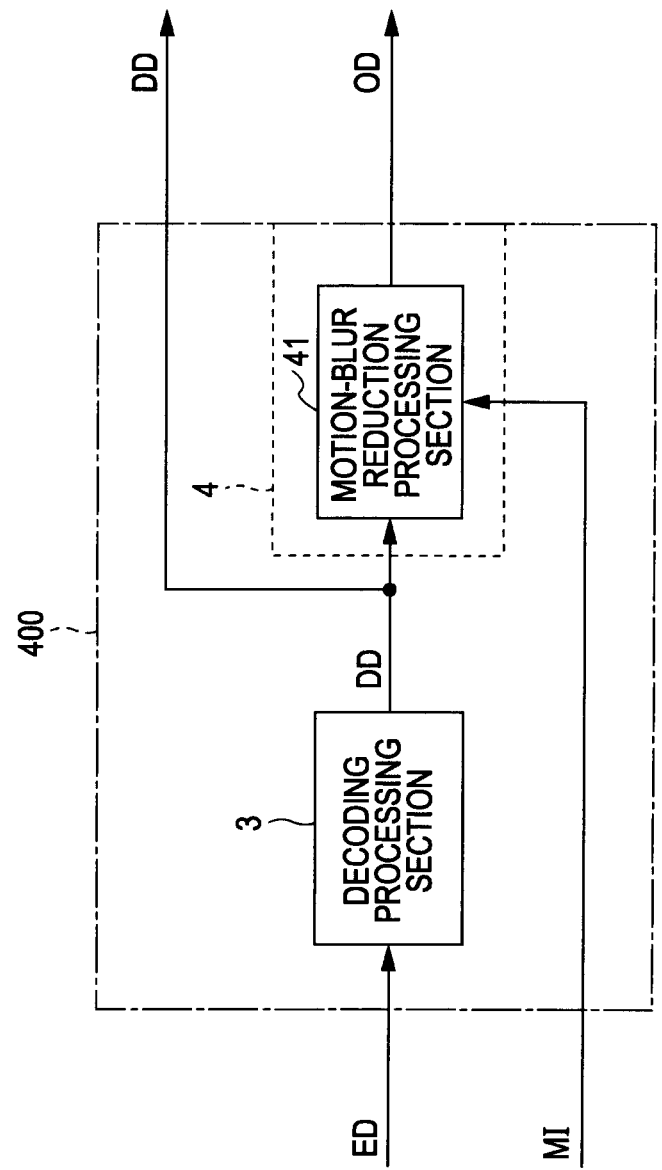
FIG. 13 is a block diagram of a second image processing apparatus according to an embodiment.

FIG. 13 illustrates a configuration in which the image processing apparatus 4 includes a motion-blur reduction processing section 41. Alternatively, FIG. 13 illustrates a configuration in which the image processing apparatus 400 includes the motion-blur reduction processing section 41 and a decoding processing section 3.

The coded moving image data ED is input into the decoding processing section 3. The decoding processing section 3 performs decoding processing on the coded moving image data ED to output the decoded moving image data DD. For example, the decoding processing section 3 performs decoding processing corresponding to the coding performed by the coding processing section 2 in the above-described first image processing apparatus 100.

Accordingly, the output moving image data DD is considered to be the moving image data to which a motion blur is added by the motion-blur addition processing section 11 of the first image processing apparatus 100.

The motion-blur reduction processing section 41 performs the motion-blur reduction processing on the moving image data DD decoded by the decoding processing section 3 in the preceding stage, and outputs the processed moving image data OD.

The motion-blur reduction processing section 41 adaptively performs the filter processing in accordance with the motion information MI corresponding to each frame or each division area of the moving image data DD input in the same manner as each frame or each division area of the moving image data after the decoding so as to reduce the motion blur.

The moving image data OD having been subjected to the motion-blur reduction processing is output to a display unit not shown in the figure, etc. In this regard, as shown in the figure, the moving image data DD decoded by the decoding processing section 3 may be output to a display unit, etc.

Here, the functions and the advantages of the second image processing apparatus 4 (400) according to the present embodiment are considered to be the following three points: i, ii, and iii.

i. Improvement of the Image Quality by Reducing Blurs of the Transmitted Moving Image The moving image data OD, which has been subjected to the motion-blur reduction processing by the motion-blur reduction processing section 41 and is output to a display unit, etc., has less blurs, which impair the details of the image, and is displayed with higher image quality compared with the case of directly displaying the decoded moving image data DD on the display unit.

That is to say, the blurs are reduced by the motion-blur reduction processing on the assumption that the transmission source of the moving image data is not particularly identified.

ii. Improvement of the Image Quality by Reducing Jerkiness and Blurs of the Moving Image Transmitted from the First Image Processing Apparatus 100

In consideration that the coded moving image data ED from which jerkiness is eliminated by the motion-blur addition processing section 11 in the above-described first image processing apparatus 100 is input into the second image processing apparatus 400, the moving image data OD having been subjected to the motion-blur reduction processing becomes the high-quality moving image data from which both jerkiness and blurs have been reduced.

That is to say, in this sense, the moving image data DD is the moving image data from which jerkiness has been reduced, and the moving image data OD is the moving image data from which jerkiness and blurs have been reduced.

iii. Restoration to the Moving Image Data Before Processed by the First Image Processing Apparatus 100

Further, in the present embodiment, it is possible to make the moving image data OD the same as the original moving image data ID input into the first image processing apparatus 100. That is to say, the motion-blur reduction processing section 41 faithfully reduces the motion blurs added by the motion-blur addition processing section 11. This is suitable for the case where a motion blur is added in view of improving the coding efficiency of the coding processing section 2 in the first image processing apparatus 100, and the original moving image data is restored by the second image processing apparatus 400 to be the transmission destination.

For example, as described above, if it is assumed that the moving image data to which a motion blur is added using the motion-blur addition processing section 11 whose configuration is shown in FIG. 12 is coded and decoded as input moving image data, the motion blur is added to the moving image data DD faithfully to the size of the motion vector VD without compensation.

Thus, if the motion-blur reduction processing section 41 performs motion-blur reduction processing using only the motion vector VD as a parameter, the same moving image data as that before a motion blur has been added by the first image processing apparatus 1 (100) can be obtained in principle.

Figure 14:
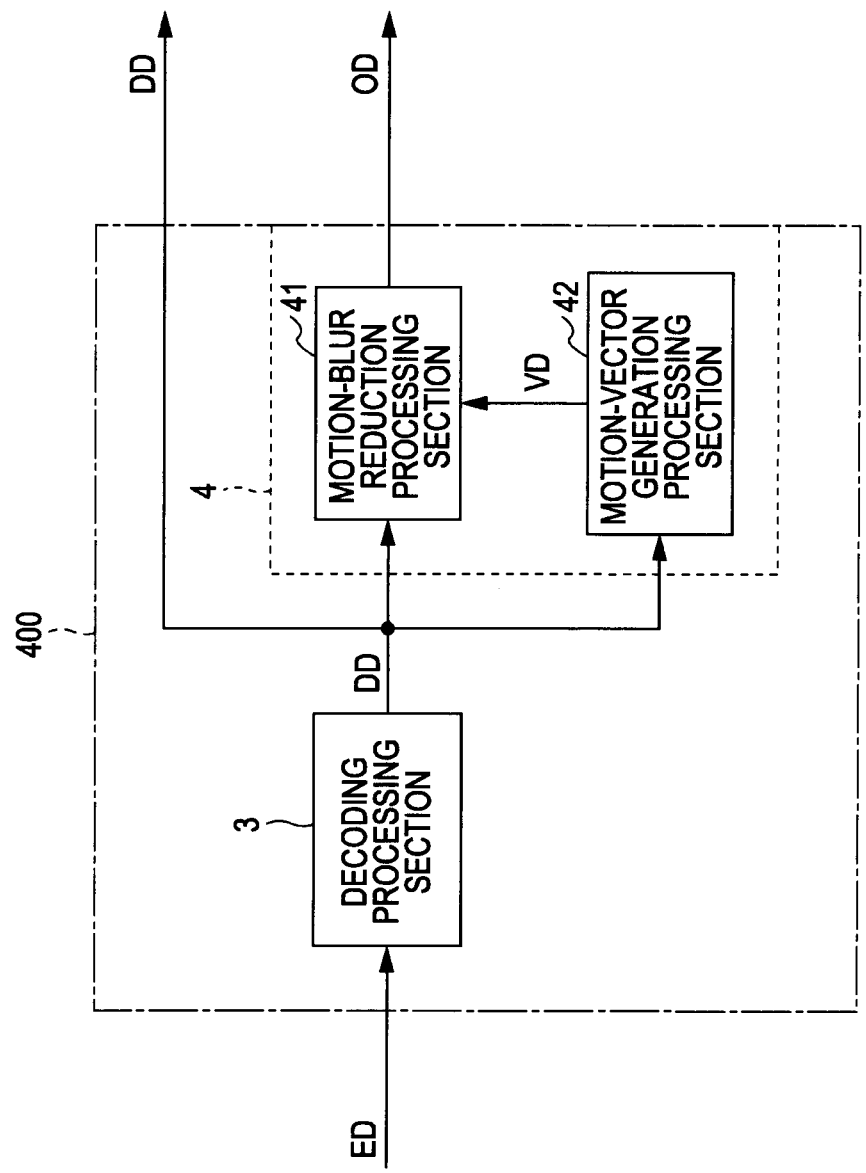
FIG. 14 is a block diagram of an example of another configuration of the second image processing apparatus according to the embodiment.

Next, FIG. 14 illustrates a configuration in which the image processing apparatus 4 includes a motion-blur reduction processing section 41 and a motion-vector generation section 42. Alternatively, FIG. 14 illustrates a configuration in which the image processing apparatus 400 includes a decoding processing section 3, the motion-blur reduction processing section 41 and the motion-vector generation section 42.

FIG. 14 is an example of the configuration in which the motion vector VD is used as an example of the motion information MI in FIG. 13.

The motion-vector generation section 42 generates the motion vector VD of each area of each frame of the decoded moving image data DD (for each pixel or for each pixel block including a plurality of pixels).

The motion-blur reduction processing section 41 adaptively performs the filter processing on (each frame of or each division area of) the decoded moving image data DD using the motion vector VD so as to perform the motion blur reduction processing. The moving image data OD having been subjected to the motion-blur reduction processing is output to a display unit, etc., not shown in the figure.

In this case, any one of the functions and the advantages of the above-described in i, ii, and iii is assumed.

Figure 15:
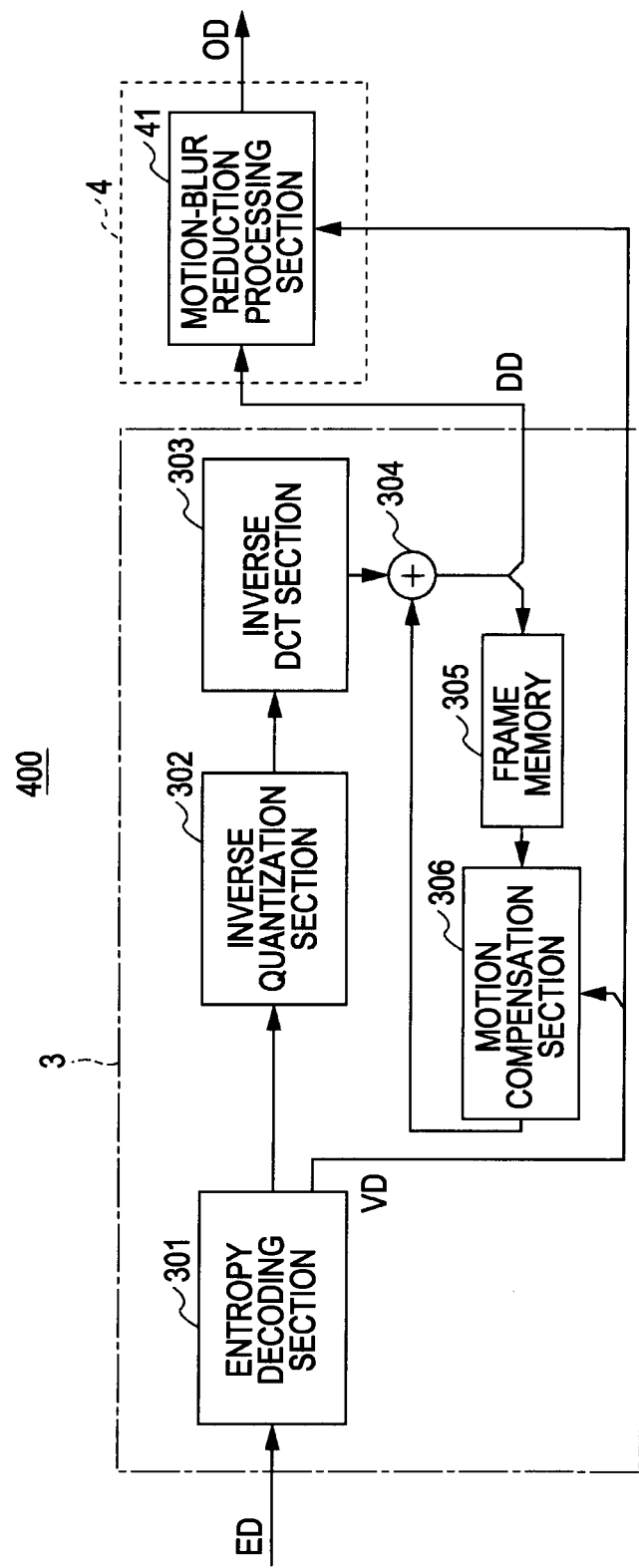
FIG. 15 is a block diagram of an example of still another configuration of the second image processing apparatus according to the embodiment.

Next, FIG. 15 is an example of the configuration in which the motion vector used in the decoding processing section 3 is used for the motion-blur reduction processing.

Motion-blur estimation processing is performed in the prediction coding based on the motion information of the image, such as MPEG in the coding processing thereof, and the motion blur estimation result is transmitted to the decoding processing section 3 together with the coding data.

The decoding processing section 3 performs the decoding processing using the above-described transmitted motion vector. In the configuration shown in FIG. 15, the motion-blur reduction processing is performed using the motion vector.

In FIG. 15, a simple MPEG coding processing block is shown. The coded moving image data ED is input into an entropy decoding section 301 in the decoding processing section 3. The entropy decoding section 301 performs decoding processing on the input coded moving image data ED, obtains quantization data, and extracts the motion vector VD. That is to say, this is the motion vector VD, for example, having been generated by the motion-vector generation processing section 210 in FIG. 4 and overlaid on the coded moving image data by the coding of the entropy coding section 204.

The entropy decoding section 301 outputs the quantization data to the inverse quantization section 302, and also outputs the motion vector VD to the motion compensation section 306 and the motion-blur reduction processing section 41.

The inverse quantization section 302 inversely quantizes the input quantization data to generate a DCT coefficient, and outputs the DCT coefficient to the inverse DCT section 303.

The inverse DCT section 303 performs inverse DCT processing on the DCT coefficient input from the inverse quantization section 302 to generate the image data, and outputs the image data to an addition section 304.

The addition section 304 adds the image data that is motion-compensated by a motion compensation section 306 and the image data input from the inverse DCT section 303, and outputs the image data as the decoded moving image data DD, and also to a frame memory 305. The image data temporarily stored in the frame memory 305 is output to the motion compensation section 306.

The motion compensation section 306 performs motion compensation processing on the image data input from the addition section 304 through the frame memory 305 on the basis of the motion vector input from the entropy decoding section 301, and outputs the image data to the addition section 304.

The moving image data DD decoded by the decoding section 3 is supplied to the motion-blur reduction processing section 41. Also, the motion vector DD is supplied to the motion-blur reduction processing section 41. The motion-blur reduction processing section 41 performs motion-blur reduction processing on the moving image data DD using the motion vector VD. The moving image data OD having been subjected to the motion-blur reduction processing is output to a display unit not shown in the figure.

Like this example, it is thought that the motion-blur reduction processing is performed using the motion vector extracted in the process of the MPEG decoding.

In this case, any one of the functions and the advantages of the above-described in i, ii, and iii is assumed.

Also, in the image processing apparatus 4 (400) of each example described above, the motion information is referenced, and adaptive filtering is carried out for each area. Thus, it is possible to reduce a motion blur for each area in accordance with the size of the motion including the adjustment of the amount of motion blur as the subsequent processing if necessary compared with the case of applying a spatially uniform low-pass filter at coding time (that is to say, a spatially uniform high-pass filter at decoding time). Accordingly, it is possible to display a natural image quality for the viewer of the moving image.

Also, in the case where the parameters of the motion-blur addition processing in the pre-processing of the coding (or it is difficult to do so) are not transmitted, it is possible to perform the motion-blur reduction processing using only the motion information. That is to say, it is possible to perform the processing by the motion vector transmitted for use in coding and decoding or only by the motion information obtained after decoding. This is an advantage over the case of applying a spatially uniform low-pass filter at coding time (that is to say, a spatially uniform high-pass filter at decoding time), because it is necessary to transmit some kind of filter information at the time of low-pass filtering in that case.

2.2 Motion-Blur Reduction Processing Section

A description will be given of the motion-blur reduction processing section 41 in the examples of the configurations in the above-described FIGS. 13, 14, and 15. Here, descriptions will be given of examples of FIG. 16 and FIG. 18 individually as the configuration of the motion-blur reduction processing section 41.

First, a description will be given of an example of the configuration of the motion-blur reduction processing section 41 in FIG. 16.

Figure 16:
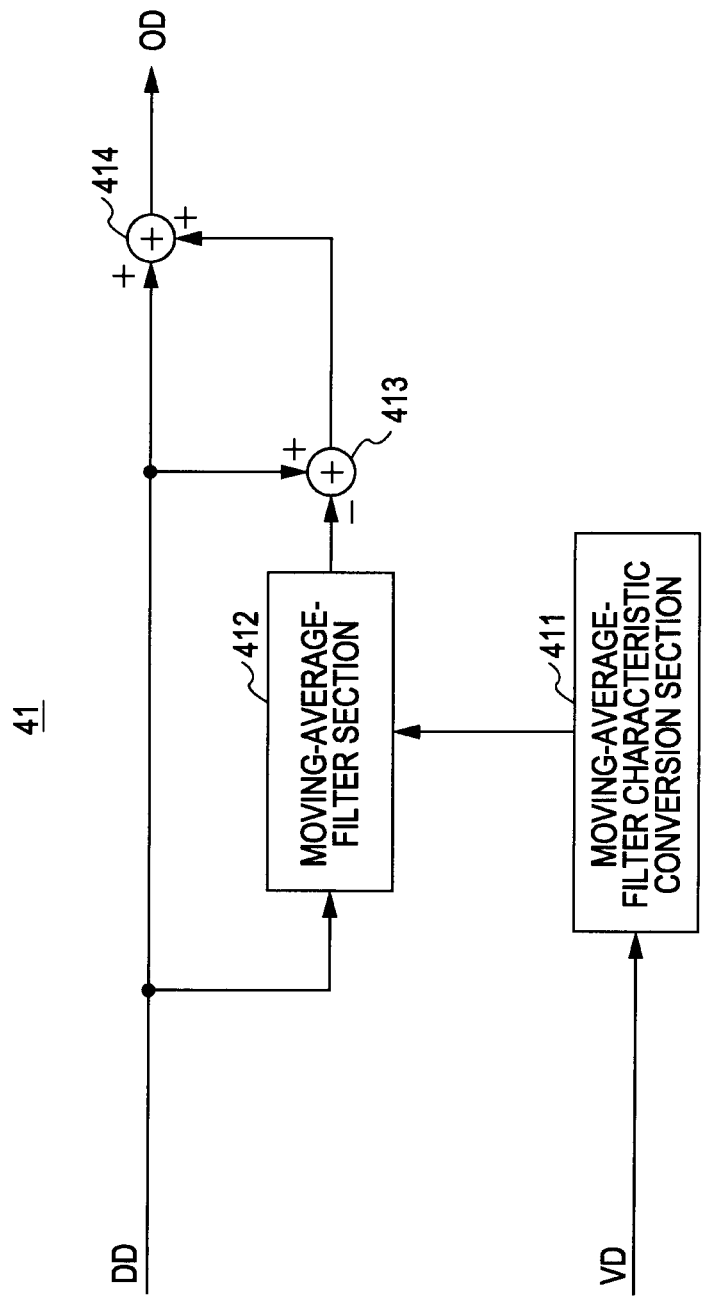
FIG. 16 is a block diagram of the motion-blur reduction processing section according to the embodiment.

The motion-blur reduction processing section 41 in FIG. 16 includes a moving-average-filter characteristic conversion section 411, a moving-average-filter section 412, a subtraction section 413, and an addition section 414, and achieves the reduction of the amount of motion blur on the input moving image data DD.

Figure 17A:
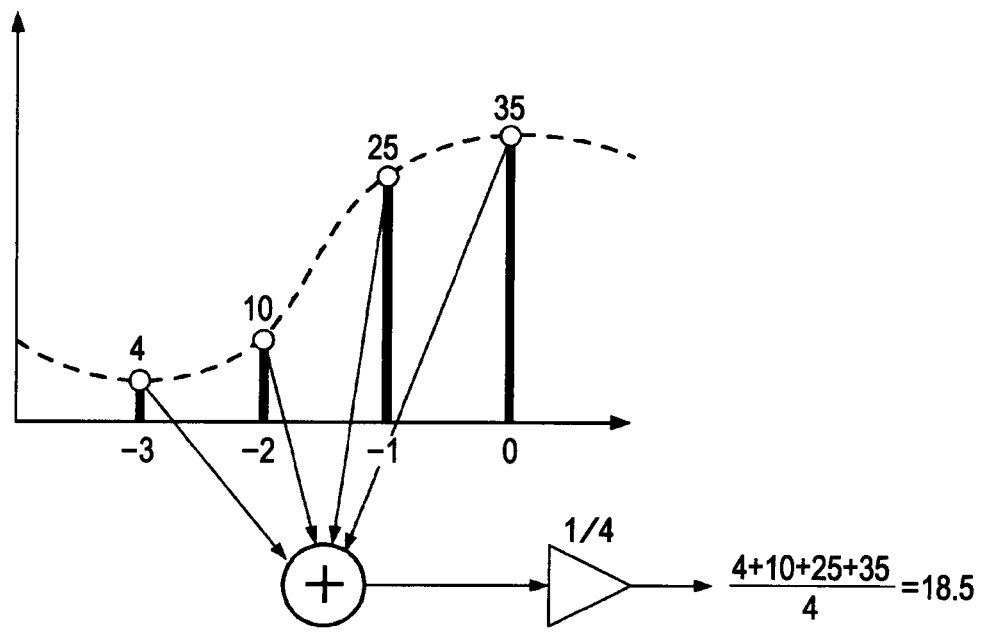
FIG. 17 is an explanatory diagram of the moving average filter.
Figure 17B:
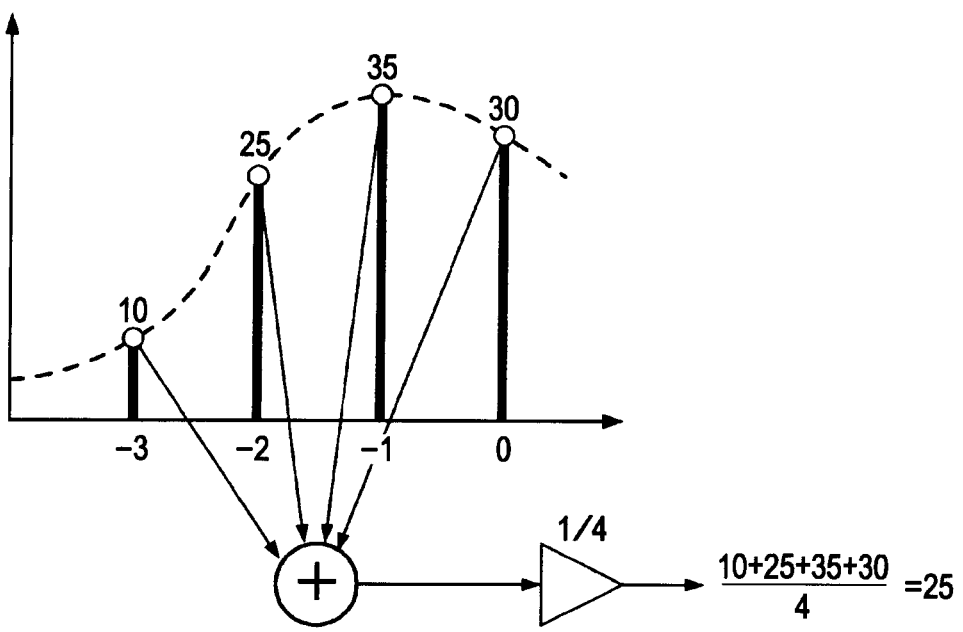

In this regard, a moving average filter used as the moving-average-filter section 412 is a kind of easiest low-pass filters, and is a filter which calculates the average value of the processing target pixel and the surrounding pixel for each pixel move. For example, at a certain point in time, the average is calculated of n samples (four in the figure) including the current sample value as shown in FIG. 17A. At the next point in time, the average is calculated of n samples (four in the figure) including the current sample value as shown in FIG. 17B. The sample values mentioned here becomes the pixel values, and the average of the n samples of the surrounding pixels including the process target pixel is output for each one pixel move of the processing target pixel.

The motion vector VD is input into the moving-average-filter characteristic conversion section 411. The moving-average-filter characteristic conversion section 411 extracts the motion vector corresponding to the position of the divided area in the moving image data DD as a filter parameter from the input motion vector VD, and determines the filter characteristic of the processing performed in the moving-average-filter section 412 on the basis of the motion vector. For example, one moving-average-filter ought to be individually provided for a plurality of motion vectors VD, and a filter to be used for a pixel of interest ought to be determined. Specifically, the determination is made as follows.

It is assumed that the characteristic of the moving average filter is translated into how may surrounding pixels of the pixel of interest is used for the average processing, and the motion vector VD is used as an example of the filter parameter. At this time, a table for determining a number of pixels to be used for the moving average filter for the motion vector VD is provided, and the number of pixels to be used for the moving average filter is output each time the motion vector VD of each area is input.

The determined number of pixels to be used for the moving average filter is output to the moving-average-filter section 412.

The moving-average-filter section 412 (low-pass filter) applies a moving average filter whose characteristic is determined by the moving-average-filter characteristic conversion section 411 on a predetermined block including the pixel of interest in the processing target frame so as to convert the pixel value of the pixel of interest. The pixel value of the pixel of interest converted by the moving-average-filter section 412 is output to the subtraction section 413.

That is to say, the pixel value of the pixel of interest converted by the moving-average-filter section 412 is inverted and input into the subtraction section 413. Also, the pixel of interest is input into the subtraction section 413 out of the processing target frames in the input motion vector DD.

The subtraction section 413 obtains the difference between the pixel value of the pixel in the moving image data DD and the pixel value of the pixel of interest converted by the moving-average-filter section 412, and outputs the difference value to the addition section 414.

In this manner, the difference between before and after the moving average filter is input to the addition section 414. Also, the pixel of interest out of the processing target frame in the moving image data DD is input to the addition section 414. The addition section 414 adds the difference value between before and after the moving average filter to the pixel value of the pixel of interest before compensation, and outputs the addition result as an output image (a part thereof).

The above is the processing contents of the motion-blur reduction processing section 41. In order to understand the meaning of this processing, it is easy to consider in a frequency domain.

If the difference between before and after the moving average filter, which is the output signal of the subtraction section 413 is considered in the frequency domain, in the frequency of interest, the difference between the input image signal gain and the image signal gain after the application of the moving average filter becomes the output signal gain of the subtraction section 413. Further, the gain of the output image signal of the addition section 414 becomes the sum of the gain of the input image signal and the difference gain before and after the moving average filter. That is to say, at each frequency, the gain of the output image signal is raised by the difference gain before and after the moving average filter compared with the input image gain.

In consideration that the moving average filter is a low-pass filter, to put the above-described contents anther way, the motion-blur reduction processing section 41 whose configuration is shown in FIG. 16 basically performs the equivalent processing as the processing of applying a high-pass filter.

Next, a description will be given of an example of the configuration of FIG. 18 as the motion-blur reduction processing section 41.

Figure 18:
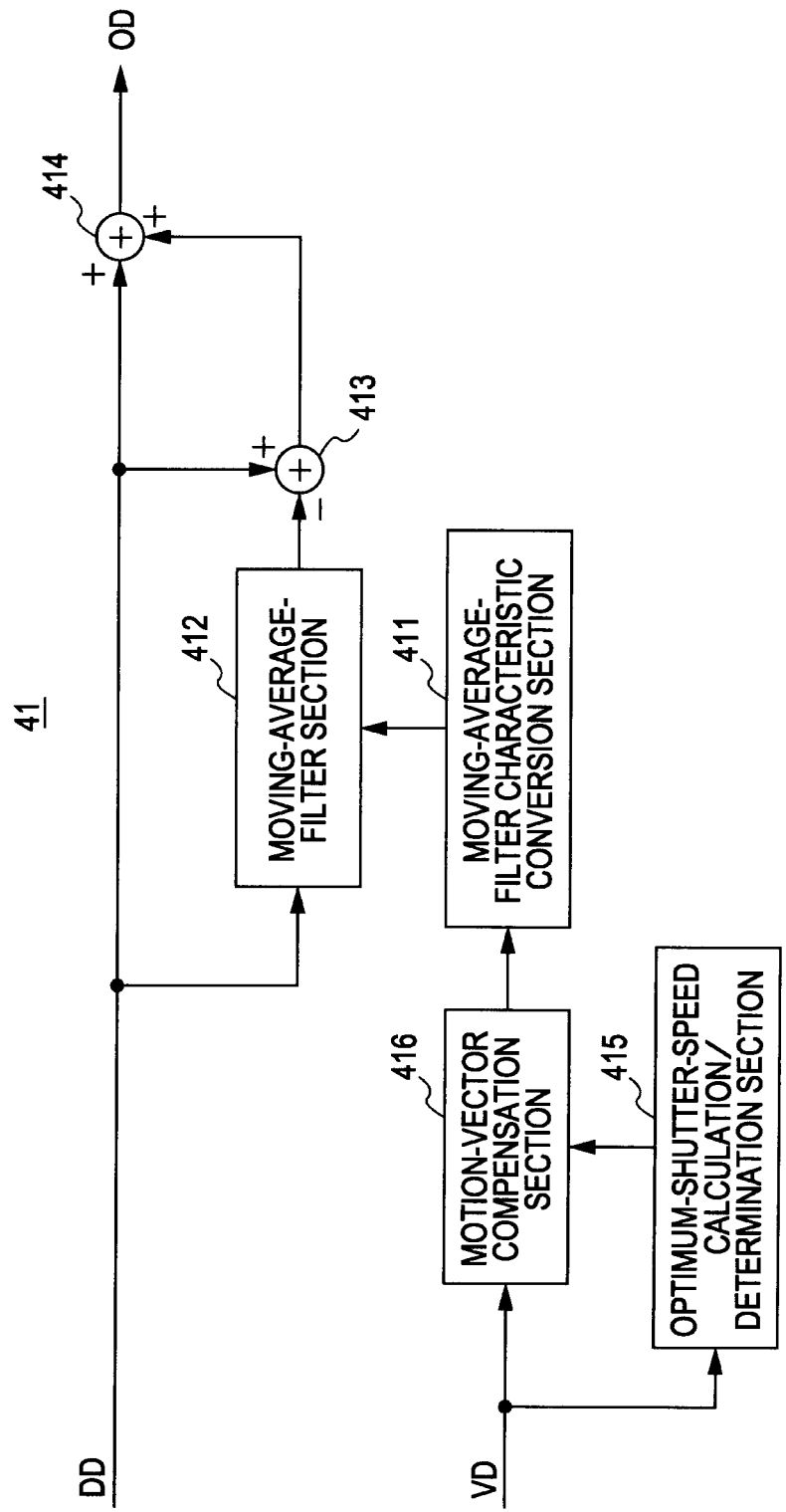
FIG. 18 is another block diagram of the motion-blur reduction processing section according to the embodiment.

The different point of the configuration in FIG. 18 from the above-described configuration in FIG. 16 is that the components of the motion-vector compensation processing, which are necessary for adjusting the amount of motion blur addition to the amount of motion blur having the greatest reduction of jerkiness, is added.

Specifically, an optimum-shutter-speed calculation/determination section 415 and a motion-vector compensation section 416 are added. The scaling processing of the motion vector is performed in the same manner as the processing performed by the optimum-shutter-speed calculation/determination section 114 and the motion-vector compensation section 115 in the motion-blur addition processing section 11 shown in FIG. 7. The different point is that the shooting shutter speed SSD is not input.

However, on the assumption that the moving image data having been subjected to the motion-blur addition processing by the motion-blur addition processing section 11 is input, in FIG. 12, described before, it ought to be thought that a motion blur is added without compensating faithfully to the size of the motion vector VD.

Then, the decoded moving image data DD may be regarded as a motion blur substantially corresponding to an open shutter condition is uniformly added. For example, the processing ought to be performed on the assumption that the moving image data shot at the longest shutter speed is constantly input in FIG. 10.

Specifically, the motion-vector compensation section 416 ought to compensate (contract) the input motion vector in accordance with, for example, the optimum shutter speed curve SS0 in FIG. 10, and output the motion vector to the moving-average-filter characteristic conversion section 411 in the subsequent stage. The processing of the moving-average-filter characteristic conversion section 411, the moving-average-filter section 412, the subtraction section 413, and the addition section 414 are the same as described above.

It is possible to implement the motion-blur reduction processing using the configurations shown in FIGS. 16 and 18. The configuration and the operation of the motion-blur reduction processing section 41 are not limited to the above-described configurations and operations as a matter of course.

3. Information Transmission Between the First and the Second Apparatuses

Next, a description will be given of the sharing of the motion-blur addition information between the first image processing apparatus 1 to be the coding preprocessor and the second image processing apparatus 4 to be the decoding postprocessor. In the above, a description has been given of the image processing apparatus 4 performing the post-processing of the decoding processing. Here, an illustration is given of the configuration in which the parameters, etc., used when the image processing apparatus 1 added the motion blur are transmitted to the decoding processing side, and the image processing apparatus 4 determines whether to perform motion-blur reduction processing or determines the degree of the amount of motion blur reduction using the received motion-blur addition information as the post-processing of the decoding.

Figure 19:
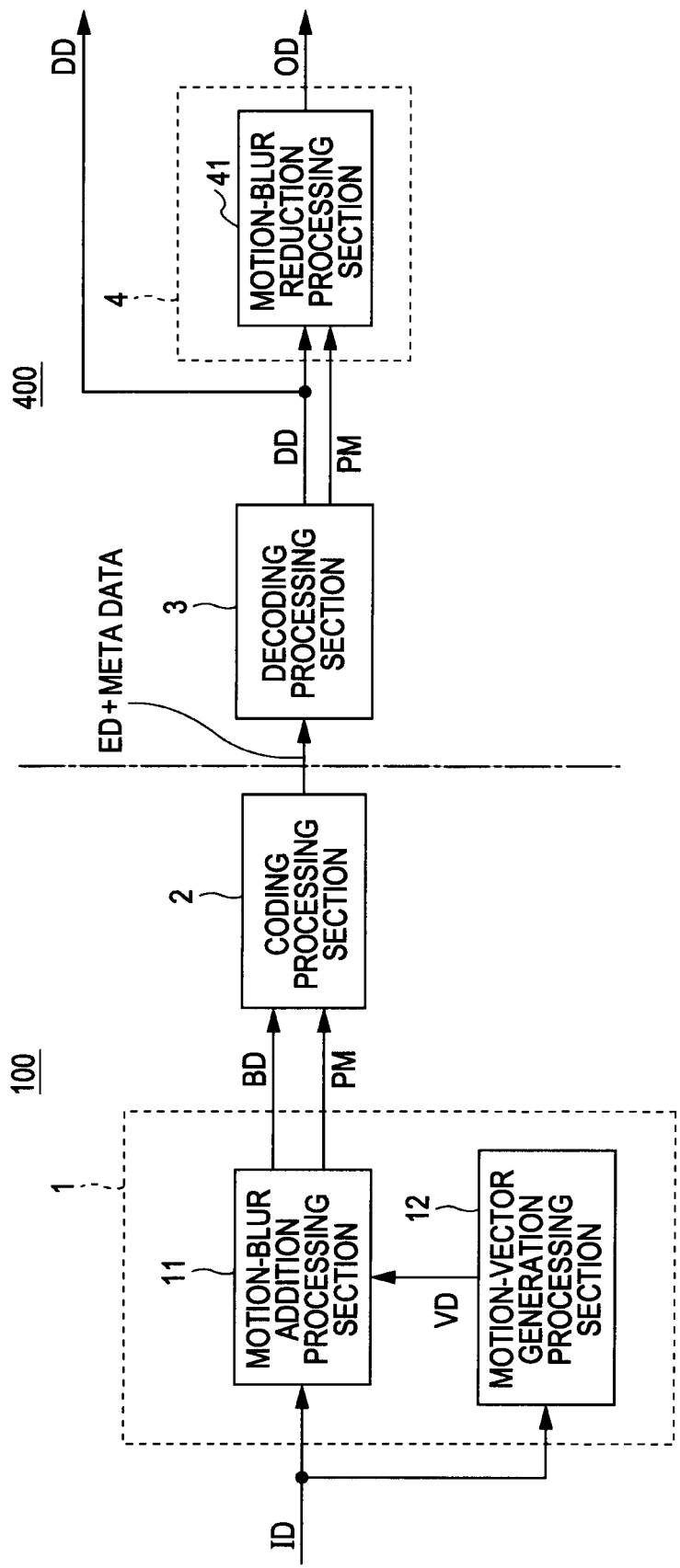
FIG. 19 is an explanatory diagram of transmission of a filter parameter according to the embodiment.

FIG. 19 illustrates the image processing apparatus 1 (100) in FIG. 3 and the image processing apparatus 4 (400) in FIG. 13.

In particular, the motion-blur addition processing section 11 transmits the motion-blur addition parameter PM used at the time of adding a motion blur to the coding processing section 2 in addition to the processed moving image data BD.

The coding processing section 2 adds the motion-blur addition parameter PM as the meta data of the coded moving image data ED, and transmits the meta data.

In the image processing apparatus 4 (400), the decoding processing section 3 performs decoding processing, and outputs the moving image data DD to the motion-blur reduction processing section 41, extracts the motion-blur addition parameter PM from the meta data, and supplies the motion-blur addition parameter PM to the motion-blur reduction processing section 41.

The motion-blur reduction processing section 41 determines the contents of the motion-blur reduction processing on the basis of the motion-blur addition parameter PM.

In this regard, as a transmission method of the motion-blur addition parameter PM, the method of using the meta data of the coding signal is described. However, the transmission method is not limited to this. The motion-blur addition parameter PM can be transmitted as another stream.

In the above-described motion-blur reduction processing section 41 in FIG. 13, etc., if it is assumed that a signal to which a motion blur is added faithfully to the motion vector (for example, without performing vector compensation processing as shown in FIG. 12) is input, it is not necessary to use the motion-blur addition parameter PM, and motion-blur reduction processing is performed by the configuration in FIG. 16 or FIG. 18.

However, as shown in FIG. 7, in the case of the signal to which a motion blur is added by selecting only areas liable to have jerkiness, or the signal to which the amount of motion blur is adjusted and added in consideration of the human perception of jerkiness, etc., it is effective to transmit the motion-blur addition parameter PM used at the time of adding the motion blur to the subsequent stage.

As a specific example of the motion-blur addition parameter PM, first, the simplest example is considered to be a flag signal of "0" or "1" indicating whether a motion blur is added or not to the pixel (or the area) in the image.

The motion-blur reduction processing section 41 refers to this flag to determine whether to perform the motion-blur reduction processing or not.

Also, as a specific example of the motion-blur addition parameter PM, the vector compensated by the configuration of FIG. 7 itself is considered to be transmitted. That is to say, the output of the motion-vector compensation section 115 in FIG. 7 is transmitted.

The motion-blur reduction processing section 41 performs the motion-blur reduction processing using the compensated vector.

Also, it is necessary to add a large amount of data for transmitting the vector itself, and thus it is thought that only the compensation value applied to the vector is transmitted as the motion-blur addition parameter PM, or only the vector conversion rule used at the time of compensation is transmitted, and the motion-blur reduction processing section 41 performs inverse vector conversion.

For example, the vector compensation value used at the time of the above-described motion-blur addition for each pixel or for each block is added to each pixel or each block, respectively, and then transmission is performed. In the simplest case, a real number $\alpha$ between 0 and 1 is transmitted, then the motion-blur reduction processing section 41 contracts the vector V using an expression $V'=\alpha \times V$, and the motion-blur reduction processing is performed. If the motion blur is not added, "0" is transmitted.

In the case of a real number, the amount of data increases, and for example, it is realistic to transmit the compensation value having been quantized using a value between 0 to N.

Also, it is thought that as the motion-blur addition parameter PM, for example, the motion-blur addition filter parameter, which is the output of the filter-parameter calculation section 111 in FIG. 7, that is to say, the values $\theta$ and $\sigma$ given to each pixel are transmitted.

Further, the following advantages are considered by transmitting the motion-blur addition parameter PM.

Even if the motion-blur addition processing section 11 adds the motion blur excessively (to the extent that a blur occur if directly displayed) as the pre-processing of the coding, it is possible to reduce the blurs by the motion-blur reduction processing section 41 reducing the motion blur.

That is to say, even if the image quality is deteriorated by adding the amount of motion blur effective for improving the compression efficiency, it is possible to recover the image quality by performing the motion-blur reduction processing in the subsequent stage using the parameter given at the time of adding the motion blur.

4. Program

The embodiments have been described on the image processing apparatuses 1 (100) and 4 (400). However, the present invention can be applied to various apparatuses performing image processing. For example, it is assumed that the apparatuses include an image playback apparatus, an imaging apparatus, a communication apparatus, an image recording apparatus, a game machine, a video edit machine, etc. Further, it is naturally assumed that the image processing apparatuses 1 (100) and 4 (400) are implemented by the other information processing apparatus, such as a general purpose computer, etc.

For example, it is possible to achieve adequate image processing using a personal computer, etc., by providing the program executing the calculation processing of the operations of individual processing blocks of FIGS. 1, 3, 4, 13, 14, and 15 as image processing application software.

That is to say, the program achieving the image processing of the image processing apparatus 100 is a program for causing the information processing apparatus to execute the motion-blur addition step performing the motion-blur addition processing on the moving image data ID by applying a filter processing in accordance with the motion information MI (for example, the motion vector VD) indicating the motion of the image between the unit images included in the moving image data ID, and the coding step coding the moving image data BD having been subjected to the motion-blur addition processing by the step of adding the motion blur and outputting the moving image data.

In this regard, if the program includes only the above-described step of adding the motion blur, the program achieves the image processing of the image processing apparatus 1.

Also, the program achieving the image processing of the image processing apparatus 400 is a program for causing the information processing apparatus to execute the decoding step decoding the coded moving image data ED having been subjected to the motion-blur addition processing, and the motion-blur reduction step performing the motion-blur reduction processing on the decoded moving image data DD obtained by the step of decoding by performing the filter processing in accordance with the motion information MI (for example, the motion vector VD) indicating the motion of the image between the unit images included in the moving image data.

In this regard, if the program includes only the above-described step of reducing a motion blur, the program achieves the image processing of the image processing apparatus 4.

By such a program, the present invention can be applied to a personal computer, a cellular phone, a PDA (Personal Digital Assistant), and the other various kinds of information processing apparatuses using image data in order to execute the same image processing.

In this regard, such a program can be recorded, in advance, in an HDD as a recording medium built in an apparatus, such as a personal computer, etc., or in a ROM, a flash memory, etc., in a microcomputer having a CPU.

Alternatively, the program can be temporarily or permanently stored (recorded) in a removable recording medium, such as a flexible disk, a CD-ROM (Compact Disc Read Only Memory), an MO (Magneto optical) disc, a DVD, a Blu-ray display, a magnetic disk, a semiconductor memory, a memory card, etc. Such a removable recording medium can be provided as so-called packaged software.

Also, the program can be downloaded from a download site through a network, such as a LAN (Local Area Network), the Internet, etc., in addition to the installation from a removable recording medium to a personal computer, etc.

The present application contains subject matter related to that disclosed in Japanese Priority Patent Application JP 2008-197947 filed in the Japan Patent Office on Jul. 31, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising
a motion-blur adding section for performing filter processing on moving image data to be subjected to coding processing as pre-processing of the coding processing in accordance with motion information indicating motion of an image between unit images included in the moving image data so that motion-blur addition processing is performed, wherein the motion-blur adding section obtains an optimum shutter speed corresponding to the subject speed for each area in the image data by referring to information relating a subject speed and a shooting shutter speed to reduce deterioration of an output image, and adjusts an amount of the motion blur on the basis of a relationship between the shooting shutter speed and the optimum shutter speed; and
a coding section for coding the moving image data having been subjected to the motion-blur addition processing by the motion-blur adding section, wherein a motion-blur addition parameter used at the time of the motion-blur adding section performing the motion-blur addition processing and the moving image data are externally output to a second image processing apparatus that decodes the moving image data and reduces the motion-blur from the decoded moving image data.

2. The image processing apparatus according to claim 1, further comprising a motion-vector generation section for generating a motion vector as the motion information from the moving image data,
wherein the motion-blur adding section performs the filter processing on the moving image data using the motion vector generated by the motion-vector generation section so that the motion-blur addition processing is performed.

3. The image processing apparatus according to claim 1, wherein the motion-blur adding section performs the filter processing adding a motion blur to the moving image data using motion information to be used for coding the moving image data in coding processing in a subsequent stage.

4. The image processing apparatus according to claim 1, wherein the motion-blur addition parameter is any one of flag information indicating whether a motion blur is added or not for each area of each unit image of the moving image data, the motion vector information used for the motion-blur addition processing, and compensation information of the motion vector.

5. A method of processing an image, comprising the steps of:
performing filter processing on moving image data to be subjected to coding processing in accordance with motion information indicating motion of an image between unit images included in the moving image data so that motion-blur addition processing is performed, wherein the motion-blur addition processing comprises obtaining an optimum shutter speed corresponding to the subject speed for each area in the image data by referring to information relating a subject speed and a shooting shutter speed to reduce deterioration of an output image, and adjusting an amount of the motion blur on the basis of a relationship between the shooting shutter speed and the optimum shutter speed;
coding the moving image data having been subjected to the motion-blur addition processing; and
externally outputting a motion-blur addition parameter used at the time motion-blur addition processing is performed and the moving image data to a separate image processing apparatus that decodes the moving image data and reduces the motion-blur from the decoded moving image data.

6. A non-transitory computer-readable medium storing instructions that, when executed by a processor, perform a method of processing an image comprising:
performing filter processing on moving image data to be subjected to coding processing in accordance with motion information indicating motion of an image between unit images included in the moving image data so that motion-blur addition processing is performed, wherein the motion-blur addition processing comprises obtaining an optimum shutter speed corresponding to the subject speed for each area in the image data by referring to information relating a subject speed and a shooting shutter speed to reduce deterioration of an output image, and adjusting an amount of the motion blur on the basis of a relationship between the shooting shutter speed and the optimum shutter speed;
coding the moving image data having been subjected to the motion-blur addition processing; and
externally outputting a motion-blur addition parameter used at the time motion-blur addition processing is performed and the moving image data to a separate image processing apparatus that decodes the moving image data and reduces the motion-blur from the decoded moving image data.

7. An image processing apparatus comprising
a motion-blur adding mechanism performing filter processing on moving image data to be subjected to coding processing in accordance with motion information indicating motion of an image between unit images included in the moving image data as pre-processing of the coding processing so that motion-blur addition processing is performed, wherein the motion-blur adding mechanism obtains an optimum shutter speed corresponding to the subject speed for each area in the image data by referring to information relating a subject speed and a shooting shutter speed to reduce deterioration of an output image, and adjusts an amount of the motion blur on the basis of a relationship between the shooting shutter speed and the optimum shutter speed; and
a coding mechanism for coding the moving image data having been subjected to the motion-blur addition processing by the motion-blur adding mechanism, wherein a motion-blur addition parameter used at the time of the motion-blur adding mechanism performing the motion-blur addition processing and the moving image data are externally output to a second image processing apparatus that decodes the moving image data and reduces the motion-blur from the decoded moving image data.

* * * * *